(12) United States Patent
Fujitani

(10) Patent No.: US 9,002,059 B2
(45) Date of Patent: Apr. 7, 2015

(54) IMAGE PROCESSING APPARATUS CAPABLE OF SELECTING A REPRESENTATIVE IMAGE FOR A GROUP OF IMAGES, IMAGE PROCESSING METHOD, AND PROGRAM

(75) Inventor: Yohei Fujitani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 298 days.

(21) Appl. No.: 13/458,066

(22) Filed: Apr. 27, 2012

(65) Prior Publication Data

US 2012/0288147 A1 Nov. 15, 2012

(30) Foreign Application Priority Data

May 11, 2011 (JP) ................... 2011-106559

(51) Int. Cl.
*G06K 9/00* (2006.01)
*G11B 27/10* (2006.01)
*G06F 17/30* (2006.01)

(52) U.S. Cl.
CPC ........ *G11B 27/105* (2013.01); *G06F 17/30265* (2013.01)

(58) Field of Classification Search
None
See application file for complete search history.

(56) References Cited

U.S. PATENT DOCUMENTS

2003/0208626 A1* 11/2003 Gibbon et al. ................ 709/247
2013/0251274 A1* 9/2013 Xie et al. ..................... 382/218

FOREIGN PATENT DOCUMENTS

JP 2007-221769 8/2007

* cited by examiner

*Primary Examiner* — Atiba O Fitzpatrick
(74) *Attorney, Agent, or Firm* — Cowan, Liebowitz & Latman, P.C.

(57) ABSTRACT

In order to enable a substitute representative image to be properly selected in a case where a representative image representing a plurality of series of related images was deleted, if a deletion or the like of the representative image is performed, whether or not the representative image is associated with an image file which is subsequently read out is discriminated on the basis of attribute information of each image. If it is associated as a result of the discrimination, a system control unit stores the attribute information of the current read-out image file and repeats a processing until an image number is equal to a minimum number or the image file which is not the unrelated image is detected. Even if the representative image is deleted, a representative image is enabled to be selected from the images associated with the deleted representative image.

10 Claims, 22 Drawing Sheets

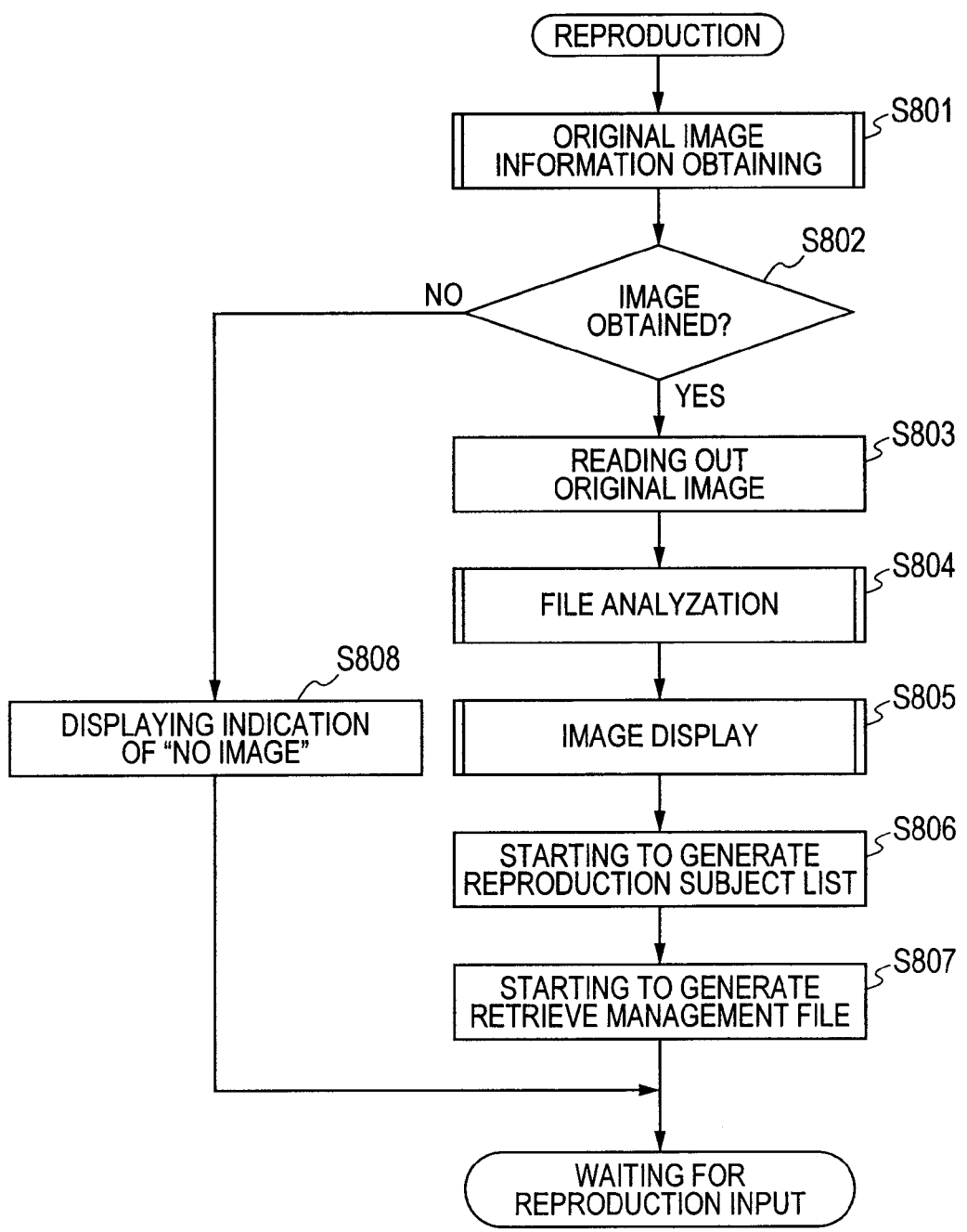

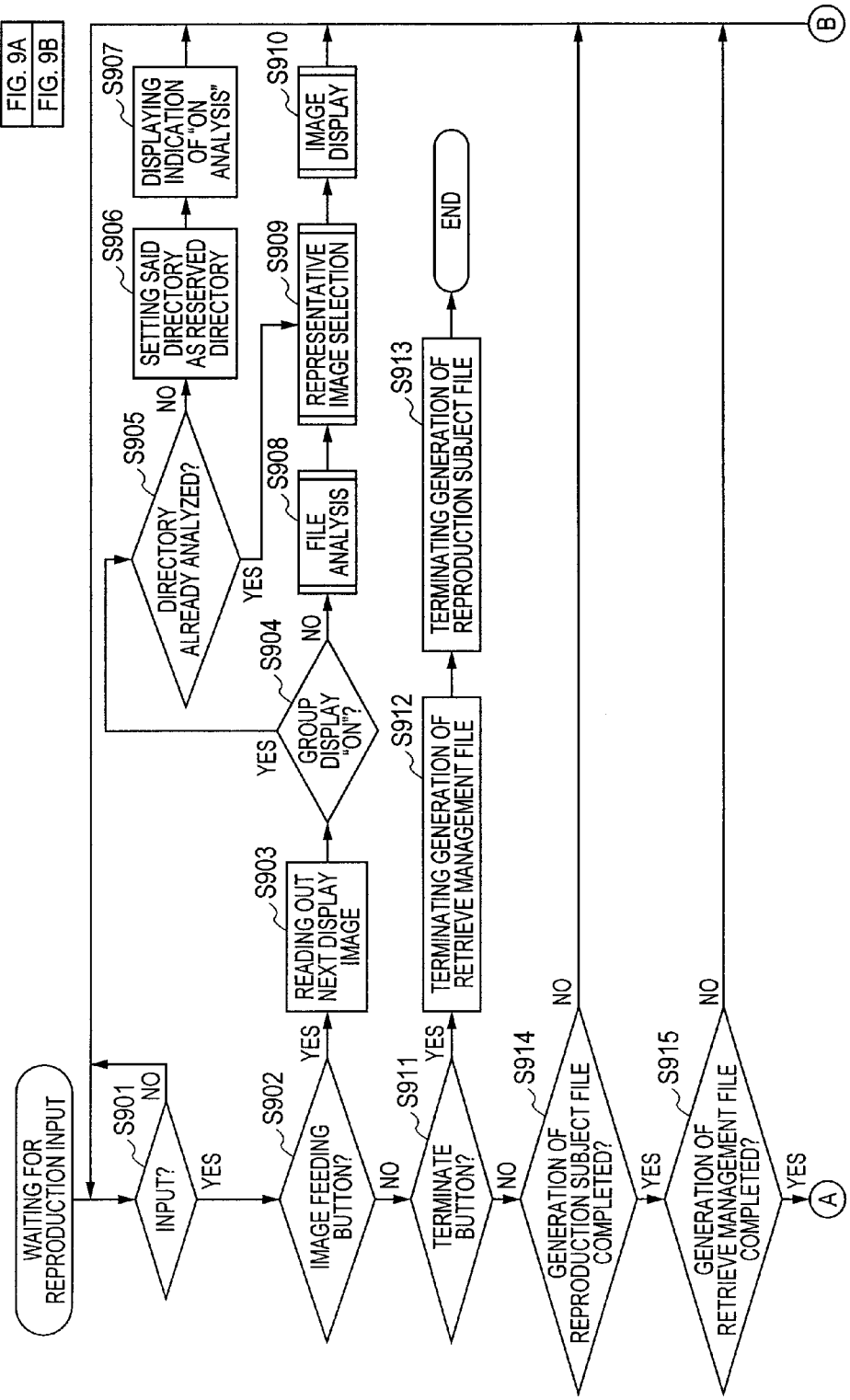

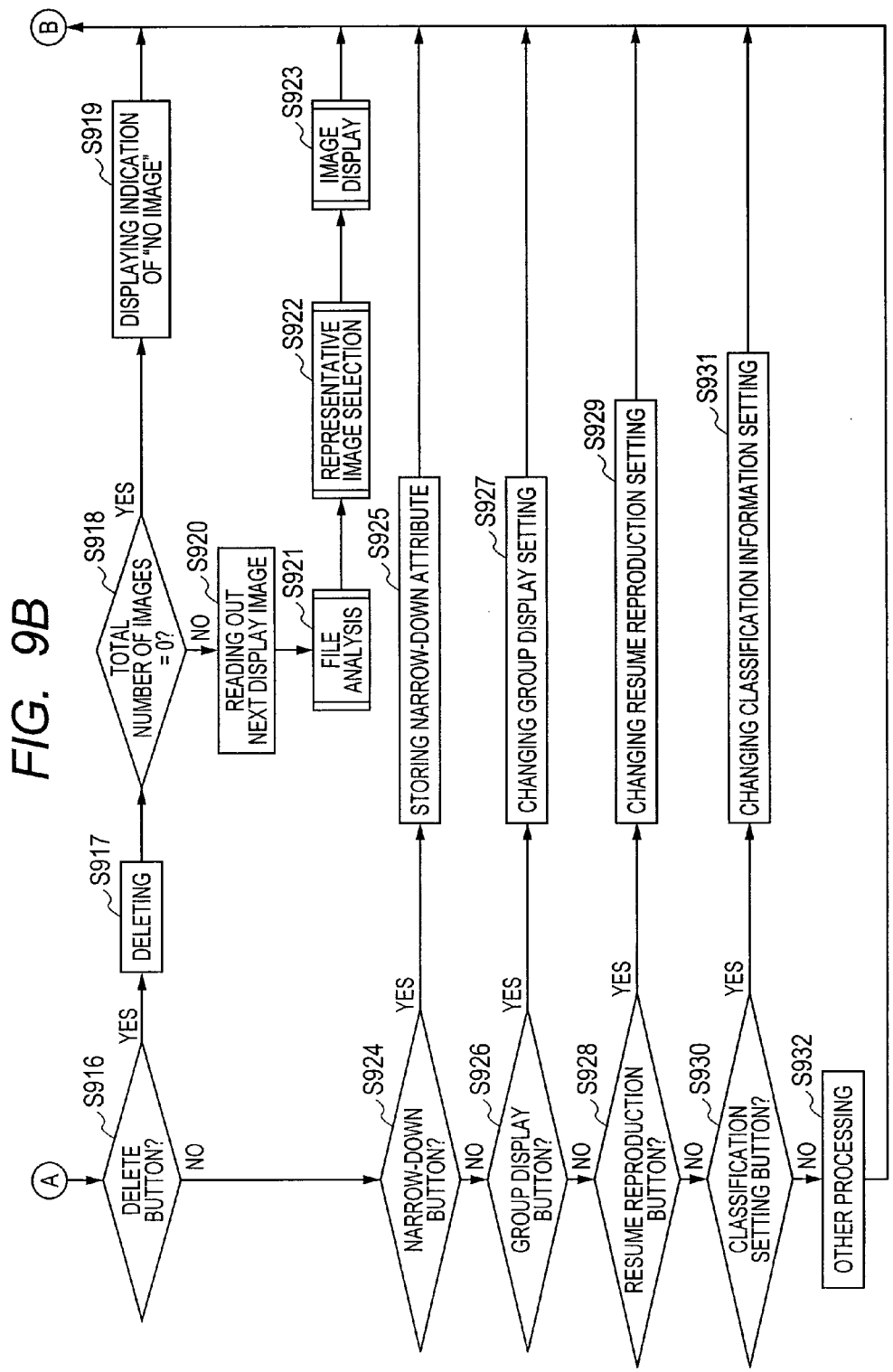

IMAGE PROCESSING APPARATUS CAPABLE OF SELECTING A REPRESENTATIVE IMAGE FOR A GROUP OF IMAGES, IMAGE PROCESSING METHOD, AND PROGRAM

BACKGROUND OF THE INVENTION

1. Field of the Invention

The present invention relates to an image processing apparatus, an image processing method, and a program and, more particularly, to a technique suitably usable for selecting a representative image from a plurality of images photographed sequentially.

2. Description of the Related Art

In recent years, a camera using a semiconductor image pickup element constructed by a CCD (Charge Coupled Device) or the like has frequently been used in place of a camera using a silver salt film. Such a type of camera has such a construction that image data is electronically recorded into a recording medium and is displayed by a display apparatus such as an LCD (Liquid Crystal Display), and is commercially available as a digital camera.

In such a digital camera, a camera of a type which has a continuous photographing function generally called a continuous photographing and can record a series of related image data also exists. There is a case where a plurality of images are photographed and recorded onto a recording medium as a series of photographing operations or mutually-related image data in accordance with user's intention. For example, according to the Official Gazette of Japanese Patent Application Laid-Open No. 2007-221769, a method whereby a plurality of recorded image data are set as related image data and a representative image is decided from those related image data and recorded is used. However, there is such an apparatus that a tag or an attribute such as "favorite" or the like can be allocated as classification information. In such an apparatus, even if the classification information is allocated to the representative image or other images among the related image data, there is a case where if the representative image of the related image data is deleted, the image for which the classification information is not considered is selected as a representative image. For example, there is a case where an image which is photographed subsequently to the deleted image but has no relationship therewith is selected as a new representative image. In such an apparatus, a selecting method of the representative image is imperfect, the user thus has to select a representative image again, and more troublesomeness is required.

SUMMARY OF THE INVENTION

It is an aspect of the present invention to solve all of or at least one of the foregoing problems.

According to one aspect of the present invention, an image processing apparatus comprises: an analyzation unit configured to analyze attribute information of each of a plurality of images; a deletion unit configured to delete a representative image representing a group which is constructed with the plurality of images, from the group; and a selection unit configured to select a representative image representing the group in place of the representative image deleted by the deletion unit on the basis of the attribute information analyzed by the analyzation unit from the images of the group from which the representative image is deleted.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a flowchart illustrating an example of a processing procedure of a reproduction mode in step S304 in FIG. 3.

FIG. 9 is comprised of FIGS. 9A and 9B, showing a flowchart illustrating an example of a reproduction processing procedure in an input waiting state in the reproduction mode.

DESCRIPTION OF THE EMBODIMENTS

Various exemplary embodiments, features, and aspects of the invention will be described in detail below with reference to the drawings.

First Embodiment

The present embodiment will be described hereinbelow with reference to the drawings. In the embodiment which will be described hereinbelow, an example in which the invention is applied to a digital camera which can photograph still images will be described.

Schematic External View of Digital Camera

Figure 1:
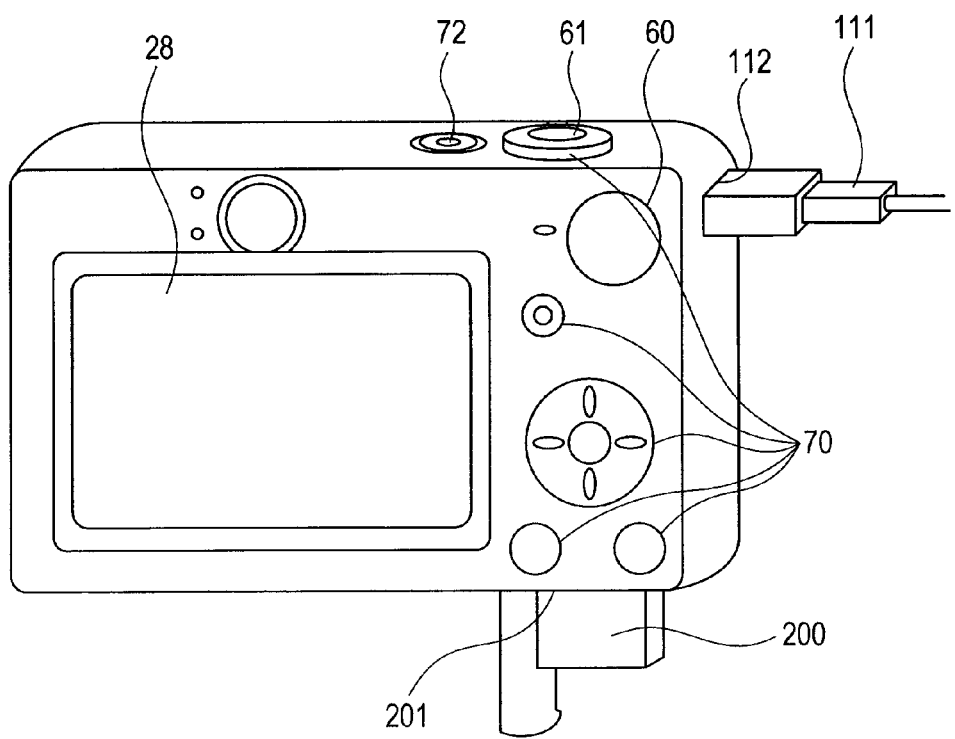
FIG. 1 is a diagram illustrating an external constructional example of a digital camera according to embodiments of the invention.

FIG. 1 is a diagram illustrating an external constructional example of a digital camera 100 according to the embodiment.

In FIG. 1, an image display unit 28 is a display unit to display an image and various kinds of information. A power switch 72 is a switch to change over a power-on and a power-off. A shutter button 61 is a button to instruct a start of photographing. A mode switch-over switch 60 is a switch to change over various kinds of modes.

A connection cable 111 is a cable to connect the digital camera 100 and an external apparatus. A connector 112 connects the connection cable 111 and the digital camera 100. An operation unit 70 is provided to receive various kinds of operations from the user. A recording medium 200 is a detachable medium such as a memory card or the like. A recording medium slot 201 is a slot to enclose the recording medium 200 to communicate therewith.

Block Diagram

Figure 2:
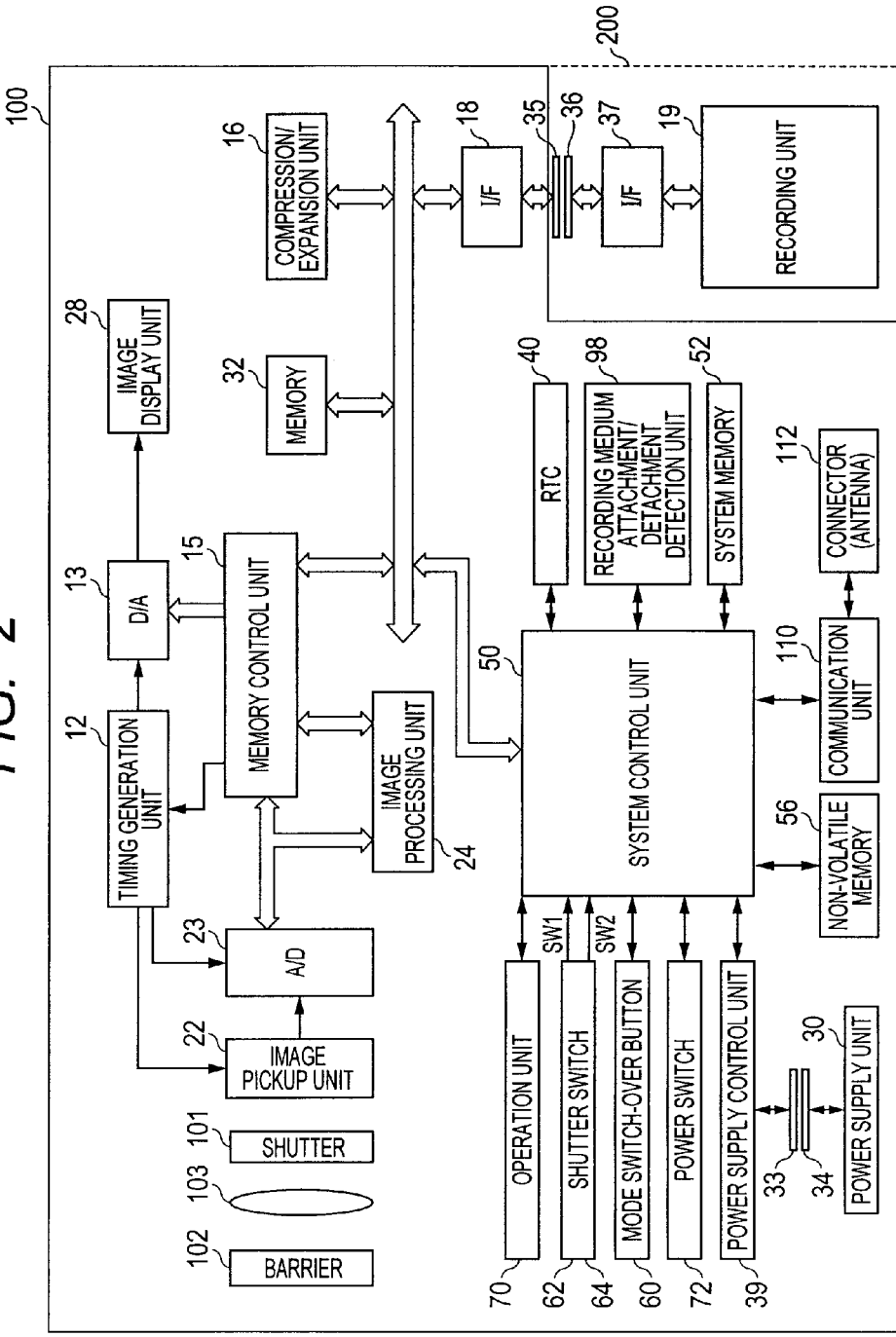
FIG. 2 is a block diagram illustrating an internal constructional example of the digital camera according to the embodiments.

FIG. 2 is a block diagram illustrating an internal constructional example of the digital camera 100 according to the embodiment.

In FIG. 2, a shutter 101 has an iris function. An image pickup unit 22 is constructed by a CCD, a CMOS element, or the like for converting an optical image into an electric signal. An A/D converter 23 is provided to convert an analog signal into a digital signal and is used when an analog signal which is output from the image pickup unit 22 is converted into a digital signal. The A/D converter 23 is also used in the case where an analog signal which is output from an audio control unit (not shown) is converted into a digital signal. A barrier 102 prevents a fouling or damage of the image pickup unit 22 by covering the image pickup unit 22 including a lens 103 of the digital camera 100.

A timing generation unit 12 is provided to supply a clock signal and a control signal to each of the image pickup unit 22, the A/D converter 23, and a D/A converter and is controlled by a memory control unit 15 and a system control unit 50. An image processing unit 24 executes a resize processing such as predetermined pixel interpolation or reduction and a color conversion processing to data from the A/D converter 23 and data from the memory control unit 15. The image processing unit 24 executes a predetermined arithmetic operation processing by using the image data which is image-picked-up and generated. The system control unit 50 performs exposure control and distance measurement control on the basis of the obtained arithmetic operation result. Thus, an AF (autofocus) processing, an AE (auto exposure) processing, and an EF (pre-flash light emission) processing of a TTL (through-the-lens) method are executed. The image processing unit 24 further executes a predetermined arithmetic operation processing by using the image data which is image-picked-up and generated and also executes an AWB (auto white balance) processing of the TTL method on the basis of the obtained arithmetic operation result.

Output data from the A/D converter 23 is written into a memory 32 through the image processing unit 24 and the memory control unit 15 or directly through the memory control unit 15. The memory 32 has a storage capacity enough to store still image data of a predetermined number of images and moving image data and audio data of a predetermined time.

A compression/expansion unit 16 is provided to compress and expand the image data by an adaptive discrete cosine transform (ADCT) or the like. The compression/expansion unit 16 reads out the image data stored in the memory 32 by using the shutter 101 as a trigger, executes a compression processing, and writes the data obtained after the processing into the memory 32. The compression/expansion unit 16 also reads out the compressed image data written in the memory 32 from a recording unit 19 or the like, executes an expansion processing, and writes the data obtained after the processing into the memory 32. The image data written in the memory 32 by the compression/expansion unit 16 is filed by a filing unit of the system control unit 50 and recorded into the recording medium 200 through an interface 18.

The memory 32 also functions as a memory for displaying images. The image display unit 28 is a display unit constructed by an LCD or the like. The image data for display written in the memory 32 is displayed by the image display unit 28 through the D/A converter 13.

The system control unit 50 is a control unit to control the whole digital camera 100. A system memory 52 is a memory to store constants, variables, a program, and the like for operation of the system control unit 50. A non-volatile memory 56 is an electrically erasable/recordable memory and, for example, an EEPROM or the like is used.

Each of a first shutter switch (SW1) 62, a second shutter switch (SW2) 64, and the operation unit 70 is an operation unit to input various kinds of operation instructions to the system control unit 50. The mode switch-over switch 60 can change over an operation mode of the system control unit 50 to any one of a still image photographing mode, a continuous photographing mode, a moving image photographing mode, a reproduction mode, and the like.

The first shutter switch (SW1) 62 is turned on on the way of the operation (in a half-depression state) of the shutter button 61 provided for the digital camera 100, thereby instructing the start of the operation such as AF (autofocus) processing, AE (auto exposure) processing, AWB (auto white balance) processing, EF (pre-flash light emission) processing, and the like. The second shutter switch (SW2) 64 is turned on by the completion of the operation (in a full-depression state) of the shutter button 61, thereby instructing the start of the operation of a series of photographing processings which are executed until the image data is written into the recording medium 200 after the signal is read out of the image pickup unit 22.

The operation unit 70 is constructed by various kinds of buttons, a touch panel, or the like. Specifically speaking, the operation unit 70 is constructed by a delete button, a menu button, an SET button, a four-direction operational key arranged in a cross shape, a print schedule button for realizing the print function for a printer connected to the connector 112, a delete button, and the like. When the menu button is depressed, a menu screen by which the user can make various kinds of settings is displayed in the image display unit 28. The user can intuitively make various kinds of settings by using the menu screen displayed in the image display unit 28, the four-direction operational key, and the SET button.

The power switch 72 is a switch to change over the power-on and the power-off. A power supply control unit 39 is constructed by a battery detection circuit, a DC/DC converter, a switch circuit to change over a block to be energized, and the like. The power supply control unit 39 detects the presence or absence of a battery, a battery type, and a residual capacity of the battery. The power supply control unit 39 controls the DC/DC converter on the basis of a detection result and an instruction from the system control unit 50 and supplies a necessary voltage to each unit including the recording medium 200 for a necessary period of time. A power supply unit 30 is constructed by a primary battery such as alkaline battery, lithium battery, or the like or a secondary battery such as NiCd battery, NiMH battery, Li battery, or the like, an AC adaptor, and the like. Connectors 33 and 34 are provided to connect the power supply unit 30 and the power supply control unit 39.

An RTC (Real Time Clock) 40 holds a power supply unit therein separately from the power supply control unit 39 and continuously holds a clocking operation state even in a state where the power supply unit 30 is OFF. The system control unit 50 makes timer control by using date and time obtained by the RTC 40 at the time of activation.

The interface 18 is provided to connect to the recording medium 200. A connector 35 is provided to connect the recording medium 200 and the interface 18. A recording medium attachment and detachment detection unit is provided to detect whether or not the recording medium 200 is attached to the connector 35. The recording medium 200 is a memory card or the like. The recording medium 200 has the recording unit 19 constructed by a semiconductor memory, a magnetic disk, or the like, an interface 37 with the digital camera 100, and a connector 36 for connecting the recording medium 200 and the digital camera 100.

A communication unit 110 executes various kinds of communication processings such as RS232C, USB, IEEE1394, P1284, SCSI, modem, LAN, radio communication, and the like. The connector (in the case of the radio communication, the antenna) 112 connects the digital camera 100 to another apparatus through the communication unit 110. A printer or the like is connected to the connector 112. When the printer is connected, such a function that an image file recorded in the recording medium 200 is transferred to the printer, so that the images are directly printed by using the printer without using a PC or the like can be also realized.

The operation of the digital camera 100 in the present embodiment will be described hereinbelow. Processings of flowcharts illustrated hereinbelow are realized by a method whereby the system control unit 50 reads out the program stored in the system memory 52 and executes arithmetic operation processings and control.

Whole Flow

Figure 3:
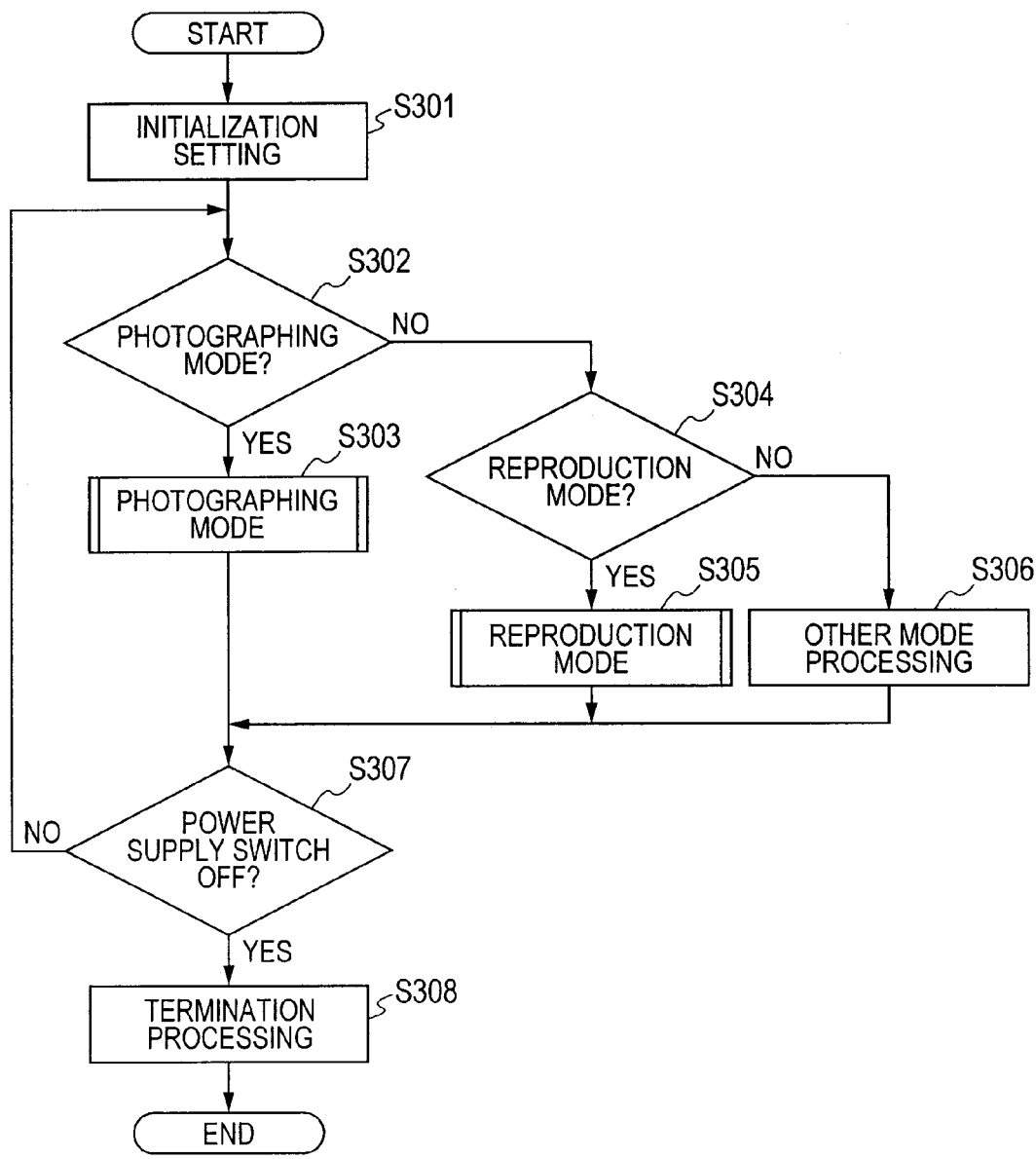
FIG. 3 is a flowchart illustrating an example of a procedure of the whole operation of the digital camera of the embodiments.

FIG. 3 is a flowchart illustrating an example of a procedure of the whole operation of the digital camera 100 of the embodiment.

First, when the power switch 72 is operated by the user and the power source is turned on, the processing is started. In step S301, the system control unit 50 initializes a flag, a control variable, and the like. Subsequently, in step S302, the system control unit 50 confirms a setting position of the mode switch-over switch 60 and discriminates whether or not the photographing mode is set. If the photographing mode is set as a result of the discrimination, the processing routine advances to step S303 and a processing in the photographing mode is executed. Details of the processing in the photographing mode in step S303 will be described hereinafter.

If the photographing mode is not set as a result of the discrimination of step S302, whether or not the reproduction mode is set is discriminated in step S304. If the reproduction mode is set as a result of the discrimination, the processing routine advances to step S305 and a processing in the reproduction mode is executed. Details of the processing in the reproduction mode in step S305 will be described hereinafter. If the reproduction mode is not set as a result of the discrimination of step S304, step S306 follows, a processing according to the selected mode is executed, and step S307 follows. As another mode which is selected, a communication mode for transmitting and receiving the file stored in the recording medium 200 or the like is included.

Subsequently, in step S307, the system control unit 50 confirms a setting position of the power supply switch 72 and discriminates whether or not the power supply switch is set to power-off by the operation of the user. If the power supply switch 72 is held in a power-on state as a result of the discrimination, the processing routine is returned to step S302. If the power supply switch 72 is set to power-off as a result of the discrimination of step S307, the processing routine advances to step S308 and a predetermined termination processing is executed. Specifically speaking, the display of the image display unit 28 is changed to a termination state and the barrier 102 is closed to protect the image pickup unit. Parameters including the flag, control variable, and the like, setting values, and the setting mode are recorded into the non-volatile memory 56. A power supply to a portion where the power supply is unnecessary is cut off. After completion of the termination processing of step S308, the processing routine is terminated.

Flow of Photographing Mode

Figure 4:
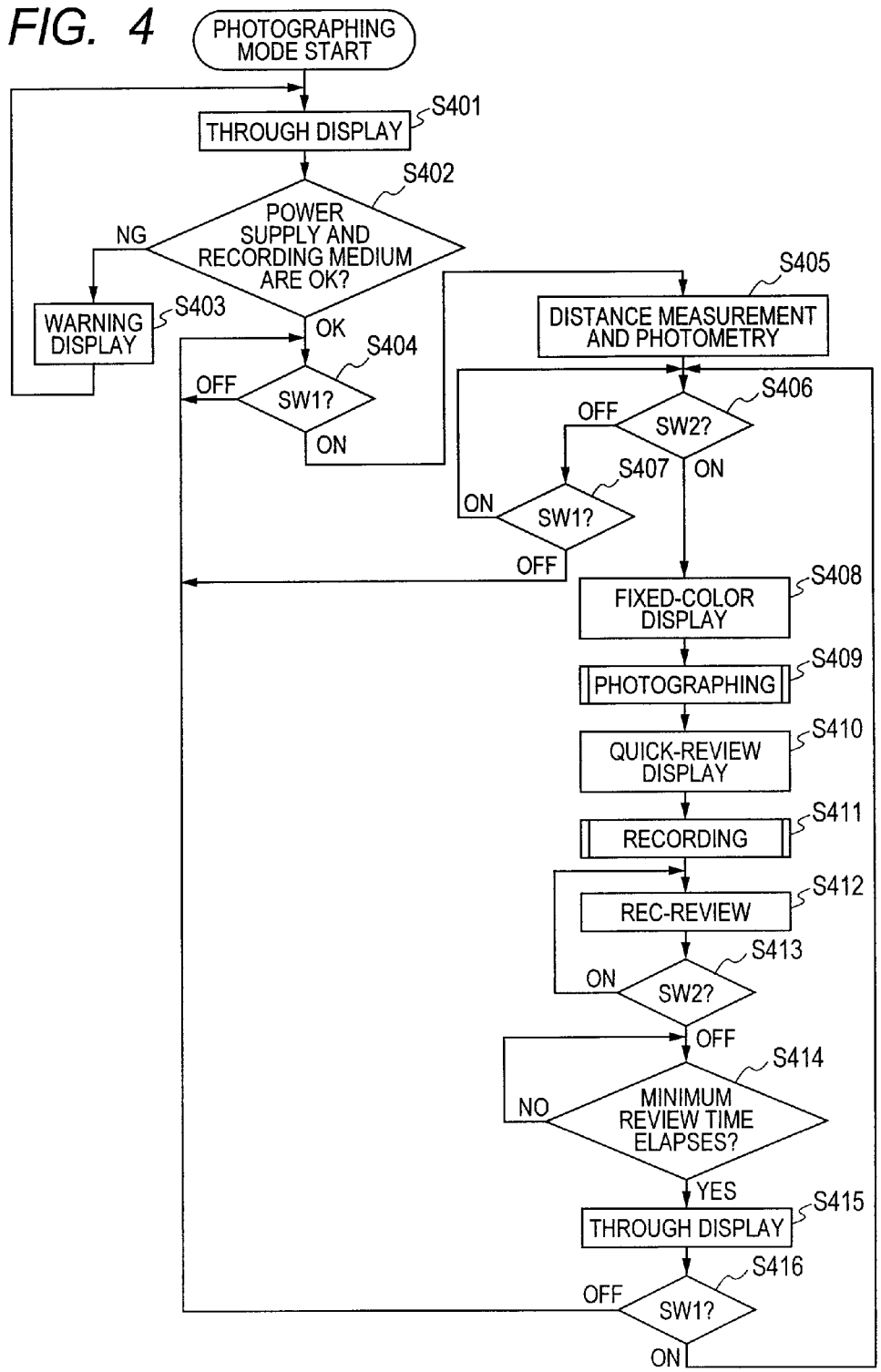
FIG. 4 is a flowchart illustrating an example of a processing procedure of a photographing mode in step S303 in FIG. 3.

FIG. 4 is a flowchart illustrating an example of a processing procedure of the photographing mode in step S303 in FIG. 3.

When the photographing mode is started, in step S401, the system control unit 50 sets the display state of the image display unit 28 into a through display state. Specifically speaking, control is made in such a manner that the image data generated through the image pickup unit 22 or the like is temporarily stored into the memory 32 by the memory control unit 15 and the image data is displayed to the image display unit 28 through the D/A converter 13.

Subsequently, in step S402, the power supply control unit 39 is allowed to confirm a residual capacity of the power supply unit 30, the recording medium attachment and detachment detection unit 98 is allowed to confirm the presence or absence of the recording medium 200 and its residual capacity, and whether or not there is a problem in the operation of the digital camera 100 is discriminated. If there is a problem in the power supply unit 30 or the recording medium 200 as a result of the discrimination, in step S403, a predetermined warning is displayed by the image from the image display unit 28. The processing routine is returned to step S401.

If there are no problems in the power supply unit 30 and the recording medium 200 as a result of the discrimination of step S402, in step S404, the apparatus waits until the shutter button 61 is half-depressed by the user and the first shutter switch (SW1) 62 is turned on. When the first shutter switch (SW1) 62 is turned on, in step S405, the distance measurement processing is executed, a focal point of the lens 103 is focused to a photographing object, a photometry processing is executed, and an aperture value and a shutter speed are determined. A setting of a flash is also performed in the photometry processing if necessary.

Subsequently, in step S406, whether or not the shutter button 61 is full-depressed by the user and the second shutter switch (SW2) 64 is turned on is discriminated. If the second shutter switch (SW2) 64 is held in an off state as a result of the discrimination, whether or not the first shutter switch (SW1) 62 is held in an on state is discriminated in step S407. If the first shutter switch (SW1) 62 is held in the on state as a result of the discrimination, the processing routine is returned to step S406. If the first shutter switch (SW1) 62 is turned off, the processing routine is returned to step S404.

If the second shutter switch (SW2) 64 is turned on as a result of the discrimination of step S406, in step S408, the system control unit 50 sets the display state of the image display unit 28 into a fixed color display state. In step S409, a photographing processing is executed. Details of the photographing processing will be described hereinafter.

Subsequently, in step S410, the system control unit 50 executes a quick-review display of the photographed image to the image display unit 28. In step S411, a recording processing for writing the image data obtained by the photographing processing into the recording medium 200 as an image file is executed. Details of the recording processing will be described hereinafter.

Subsequently, in step S412, the quick-review display in the image display unit 28 is continued (rec-review). The digital camera 100 according to the present embodiment has the rec-review function, so that a user can carefully confirm the photographed image.

In step S413, whether or not the second shutter switch (SW2) 64 is held in the on state is discriminated. If the second shutter switch (SW2) 64 is held in the on state as a result of the discrimination, the processing routine is returned to step S412 and the rec-view is continued. If the second shutter switch (SW2) 64 is turned off as a result of the discrimination of step S413, in step S414, the apparatus waits until a predetermined minimum review time elapses.

When the predetermined minimum review time elapses, in step S415, the system control unit 50 sets the display state of the image display unit 28 into a through display state. After the photographed image is displayed for a predetermined time by the quick-review display in the image display unit 28, the display mode can be set into the through display state in which the image photographed by the next photographing is sequentially displayed.

In step S416, whether or not the first shutter switch (SW1) 62 is held in the on state is discriminated. If the first shutter switch (SW1) 62 is held in the on state as a result of the discrimination, the processing routine is returned to step S406. If the first shutter switch (SW1) 62 is turned off, the processing routine is returned to step S404.

Photographing Processing

Figure 5:
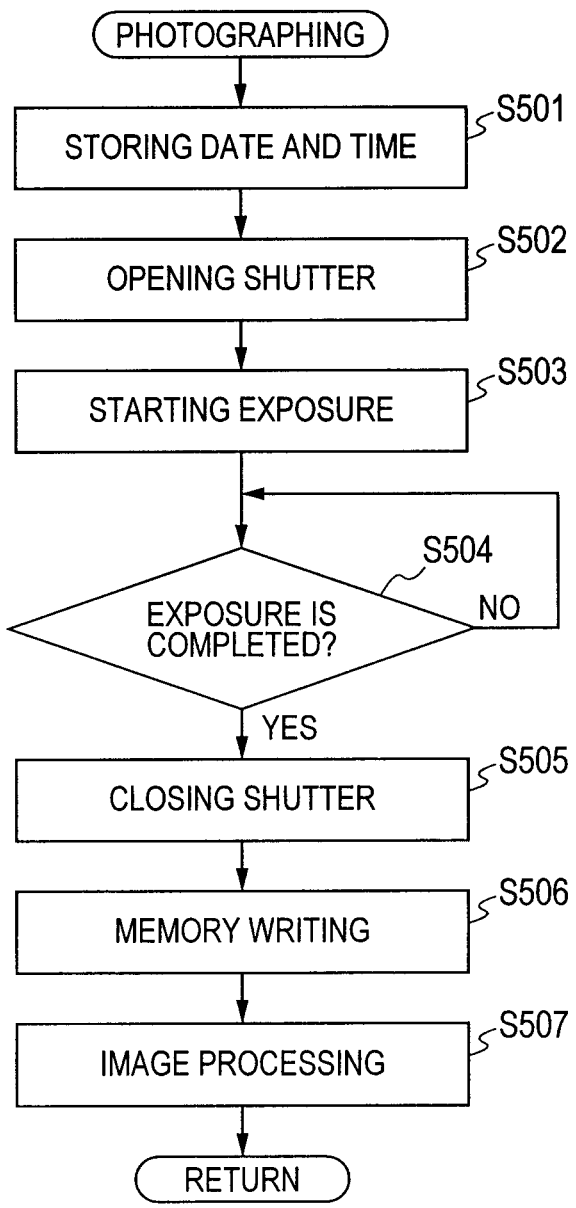
FIG. 5 is a flowchart illustrating an example of a procedure of a photographing processing in step S409 in FIG. 4.

FIG. 5 is a flowchart illustrating an example of a procedure of the photographing processing in step S409 in FIG. 4.

First, in step S501, when the photographing is started, the system control unit 50 obtains date and time of the photographing start by the RTC 40 and stores into the system memory 52. In step S502, the shutter 101 having the iris function is opened in accordance with an aperture value on the basis of photometry data stored in the system memory 52 or the memory 32. Further, in step S503, control is made so as to start an exposure of the image pickup element of the image pickup unit 22.

Subsequently, in step S504, the system control unit 50 waits until the exposure of the image pickup element is completed in accordance with the photometry data. When the exposure is finished, in step S505, the shutter 101 is closed. Subsequently, in step S506, a charge signal is read out of the image pickup element and the photographed image data is written into the memory 32 through the A/D converter 23, image processing unit 24, and memory control unit 15 or directly through the memory control unit 15 from the A/D converter 23.

Subsequently, in step S507, the system control unit 50 reads out the image data stored in the memory 32, sequentially executes image processings such as a compression processing and the like by the compression/expansion unit 16, and writes again the image data obtained after completion of the processings into the memory 32. The photographing processing is finished.

Recording Processing

Figure 6:
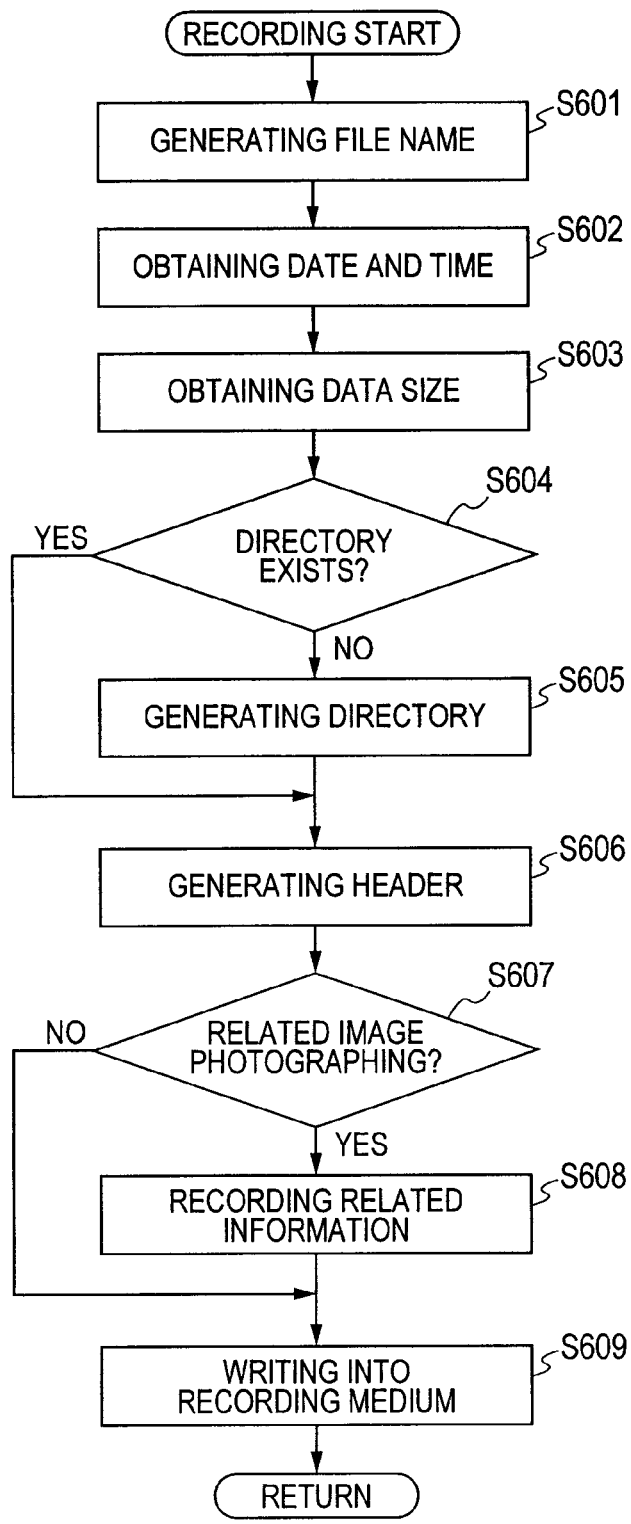
FIG. 6 is a flowchart illustrating an example of a procedure of a recording processing in step S411 in FIG. 4.

FIG. 6 is a flowchart illustrating an example of a procedure of the recording processing in step S411 in FIG. 4.

First, in step S601, the system control unit 50 generates a file name in accordance with a file name generation rule. In step S602, date and time information stored in the system memory 52 in step S501 in FIG. 5 is obtained. In step S603, information of the data size of the image data stored in the memory 32 is obtained.

Figure 7A:
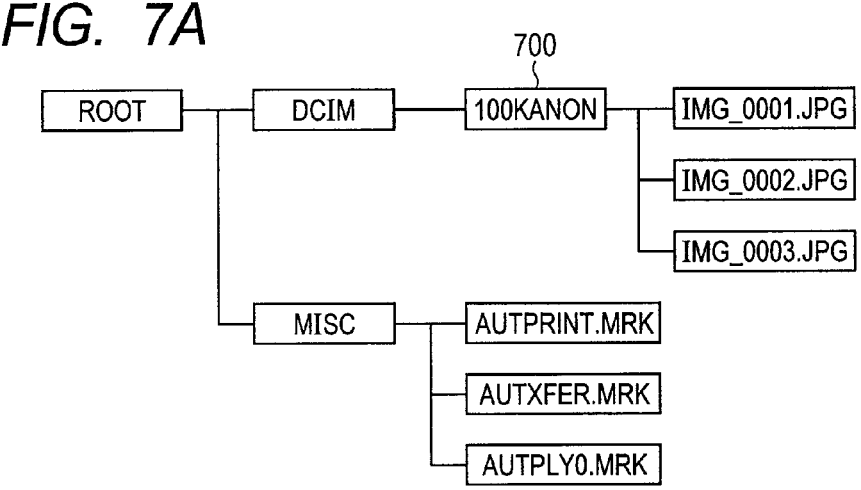
FIGS. 7A and 7B are diagrams illustrating a construction of a directory and a structural example of an image file.

Subsequently, in step S604, the system control unit 50 discriminates whether or not a directory to store the generated file exists in the recording medium 200. If the directory exists as a result of the discrimination, the processing routine advances to step S606. If the directory does not exist, in step S605, the system control unit 50 generates a directory to store the file. For example, a directory 700 having a name "100KANON" is generated as illustrated in FIG. 7A.

Subsequently, in step S606, a file header constructed by information such as photographing date and time, photographing conditions, and the like is generated to the image data stored in the memory 32 in the photographing processing in step S409 in FIG. 4. A construction of the image file including the file header and the like will be described hereinafter.

Subsequently, in step S607, whether or not the subject image data is the data obtained by the photographing of a part of the related image is discriminated. This discrimination is performed on the basis of the settings in the operation unit 70 for designating a stitch photographing, a bracket photographing, a continuous photographing mode, or the like or on the basis of the setting position of the mode switch-over switch 60. If the subject image data is not the data obtained by the photographing of a part of the related image as a result of the discrimination, the processing routine advances to step S609. If the subject image data is the data obtained by the photographing of a part of the related image as a result of the discrimination of step S607, in step S608, during the photographing of a series of images, related information is recorded to the file header generated in step S606.

Subsequently, in step S609, directory entry information is formed from the file name obtained in step S601 and the date and time information obtained in step S602, and the image data is recorded as an image file into the recording medium 200. The recording processing is finished.

File Structure

Figure 7B:
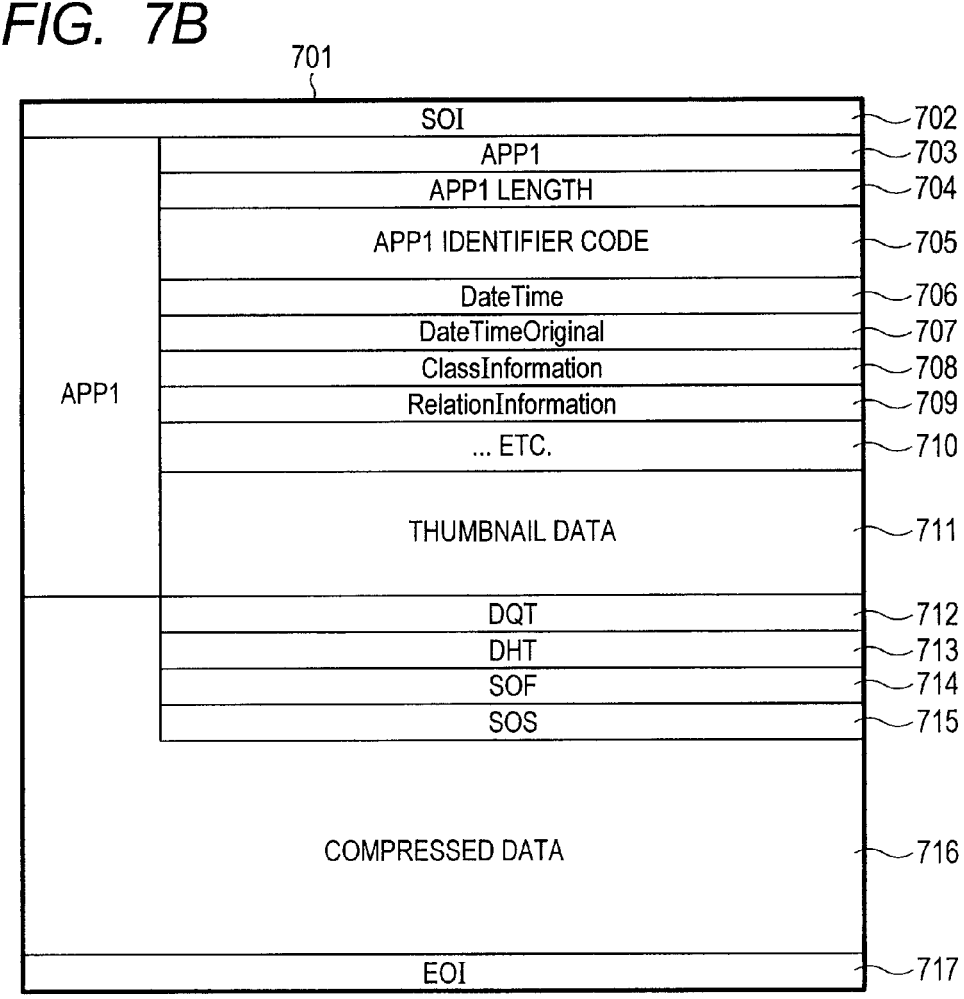

FIG. 7B is a diagram illustrating a structural example of the image file which is recorded into the recording medium 200.

In FIGS. 7A and 7B, an image file 701 has, at the head thereof, a marker SOI 702 showing the start of the image, and has an application marker APPI after it. A size 703 of APPI, a length 704 of APPI, an identifier code (ID code) 705 of APPI, and DateTime 706 showing forming date and time of the image are included in the application marker APPI. DateTimeOriginal 707 showing forming date and time of the image data, ClassInformation 708 showing classification information allocated to the image, and RelationInformation 709 showing a relation of the image are also included in the application marker APPI. Further, other information 710 including photographing information and the like and thumbnail image data 711 are included.

In the case of generating the directory entry information in step S609, the photographing date/time information obtained from the system memory 52 in step S602 is stored in DateTime 706 and DateTimeOriginal 707. The classification information stored in the system memory 52 is stored in ClassInformation 708. Predetermined information showing that there is a relation among a plurality of photographed images is described in RelationInformation 709. The predetermined information may be an image number of the related image which is first recorded or information showing a specific photographing mode.

The image data to be recorded is constructed by a quantization table DQT 712, a Huffman table DHT 713, a frame start marker SQF 714, a scan start marker 715, and compressed data 716. The image data is terminated by a marker EOI 717 showing the end of the image data. The file structure shown in the present embodiment is a structure defined as an Exif standard and a fact that the file structure is an Exif structure can be confirmed by referring to the APPI code and the ID code 705.

Reproduction Processing

FIG. 8 is a flowchart illustrating an example of a reproduction processing procedure in the reproduction mode in step S304 in FIG. 3.

First, in step S801, original image information is obtained from the recording medium 200. The original image information is information of a latest image or an image displayed by the previous reproduction. If the apparatus enters the reproduction mode, by obtaining the original image information before the total number of images is calculated or a retrieve management file is generated, a processing result can be rapidly displayed. Details of step S801 will be described hereinbelow.

Subsequently, in step S802, whether or not an obtaining processing of the original image information executed in step S801 is correctly executed is discriminated. As an example in which the obtaining processing of the original image information is not correctly executed, a state where there are no images, a state where the image information cannot be obtained due to a defective of the recording medium 200, or the like is considered. Therefore, if the original image information could correctly be obtained, it can be determined that at least one image exists.

If the obtaining processing of the original image information is correctly executed as a result of the discrimination of step S802, in step S803, an image file corresponding to the original image is read out of the recording medium 200 on the basis of the original image information obtained in step S801. In step S804, a file analyzation processing of photographing information, attribute information, and the like of the read-out image file of the original image is executed. Details of the file analyzation processing will be described hereinafter.

Subsequently, in step S805, the read-out original image is displayed. Further, the information such as photographing information, attribute information, and the like is also displayed in accordance with the settings. If illegal data such as data in which a part of the file is broken or the like exists, an error indication is also performed in accordance with a file analyzation result of step S804. Details of the image display processing will be described hereinafter.

Subsequently, in step S806, a processing to generate a reproduction subject list of the image files recorded in the recording medium 200 is started. For example, in a reproducing apparatus which conforms with the DCF standard, the reproduction subject list is a list in which the directory entry information of a DCF root directory is analyzed and the image data which can be reproduced by the reproducing apparatus is preliminarily obtained and managed. The generation processing of the reproduction subject list is asynchronously executed and the processing routine advances to the next processing without waiting for completion of the generation processing. Many image files are recorded in the recording medium 200. Even in the case where it takes a long time for retrieval based on the reproduction subject list, the image can be browsed. Details of the generation processing of the reproduction subject list will be described hereinafter.

Subsequently, in step S807, the generation of a retrieve management file is started. The retrieve management file is a list in which attribute information included in the image file is preliminarily obtained and managed. By preliminarily generating the retrieve management file, a processing such as reproduction or deletion of every attribute can be rapidly executed. In a manner similar to the generation of the reproduction subject list, a retrieve list generation processing is also terminated without waiting for completion of such a processing and the processing routine advances to an input waiting state. If the obtaining processing of the original image information is not correctly executed as a result of the discrimination of step S802, in step S808, a message such as "no image" or the like is displayed to the image display unit 28, the processing is finished, and the processing routine advances to an input waiting state.

Reproduction Mode Input Waiting State

FIG. 9 is comprised of FIGS. 9A and 9B showing a flowchart illustrating an example of a reproduction processing procedure in the input waiting state in the reproduction mode.

First, in step S901, the apparatus waits until there is some input. The "input" used here includes an input associated with the operation of various kinds of buttons of the operation unit 70 by the user, the operation to a battery cover, an event which informs the apparatus of a decrease in capacity of the power source, a completion notification of the generation processing of the retrieve management file started in step S807 in FIG. 8, or the like.

If there is some input, in step S902, whether or not the input contents are the input associated with the operation of an image feed button by the user is discriminated. If the input contents are the input associated with the operation of the image feed button as a result of the discrimination, in step S903, an image file corresponding to the next display image is read out of the recording medium 200. The image feed button is formed by a pair of direction buttons and the next display image is changed correspondingly to the feeding direction indicated by the depressed direction button.

Subsequently, in step S904, whether or not a group display setting is "ON" is discriminated. The group display setting is set in step S927, which will be described hereinafter. If the group display setting is "OFF" as a result of the discrimination, in step S908, the file analyzation processing of the photographing information, attribute information, and the like is executed to the image file read out in step S903. The file analyzation processing is a processing similar to step S804 in FIG. 8 mentioned before.

Subsequently, in step S909, a representative image selection processing is executed. The representative image selection processing will be described hereinafter. In step S910, the image display processing is executed to the read-out image. The image display processing is a processing similar to step S805 in FIG. 8 mentioned before. After completion of the display, the apparatus is returned to the input waiting state of step S901.

If the group display setting is "ON" as a result of the discrimination of step S904, in step S905, whether or not the directory of the image file read out in step S903 is already analyzed is discriminated. If the directory is already analyzed as a result of the discrimination, step S909 follows. If the directory is not analyzed yet, in step S906, the directory of the image file read out in step S903 is stored into the system memory 52 as a reserved directory. In step S907, a message or icon to inform a fact that the directory is being analyzed is displayed to the image display unit 28. The reserved directory which is set here is preferentially analyzed in a retrieve management file generation processing, which will be described hereinafter.

If the input contents are not the input associated with the operation of the image feed button as a result of the discrimination of step S902, in step S911, whether or not the input contents are the input associated with the operation of a terminate button is discriminated. If the input contents are the input associated with the operation of the terminate button, in step S912, the generation processing of the retrieve management file is terminated. In step S912, if the retrieve management file is on the way of the generation, the processing is interrupted. If the retrieve management file is already generated, nothing is performed.

Subsequently, in step S913, the generation processing of the reproduction subject list is terminated. Also in step S913, in a manner similar to the processing of step S912, if the generation processing of the reproduction subject list is still on the way of the generation, the generation is interrupted. If the reproduction subject list is already generated, nothing is performed. The processing is terminated and the processing routine advances to step S307 in FIG. 3.

If the input contents are not the input associated with the operation of the terminate button as a result of the discrimination of step S911, in step S914, whether or not the generation of the reproduction subject list which is started in step S806 in FIG. 8 is already terminated is discriminated. If the generation of the reproduction subject list is not terminated yet as a result of the discrimination, the processing routine is returned to step S901. At this time, a message or icon to inform a fact that the generation of the reproduction subject list is not terminated yet may be displayed.

If the generation of the reproduction subject list is already terminated as a result of the discrimination of step S914, in step S915, whether or not the generation processing of the retrieve management file which is started in step S807 in FIG. 8 is already terminated is discriminated. If the generation processing of the retrieve management file is not terminated as a result of the discrimination, the processing routine is returned to step S901. At this time, in a manner similar to the case where the generation of the reproduction subject list is not terminated yet, a message or icon to inform a fact that the generation of the reproduction subject list is not terminated yet may be displayed.

If the generation processing of the retrieve management file is already terminated as a result of the discrimination of step S915, in step S916, whether or not the input contents are the input associated with the operation of a delete button is discriminated. If the input contents are the input associated with the operation of the delete button as a result of the discrimination, in step S917, the current image displayed in the image display unit 28 is deleted from the display screen.

Subsequently, in step S918, the total number of images after the deletion is discriminated. If the total number of images is equal to 0 as a result of the discrimination, in step S919, in a manner similar to the processing of step S808 in FIG. 8, a message such as "no image" or the like is displayed to the image display unit 28, the processing routine is returned to step S901. If the total number of images is equal to or larger than 1 as a result of the discrimination of step S918, in step S920, an image file corresponding to the next display image is read out of the recording medium 200. Since processings of subsequent steps S921 to S923 are similar to the processings of steps S908 to S910, their description is omitted.

If the input contents are not the input associated with the operation of the delete button as a result of the discrimination of step S916, in step S924, whether or not the input contents are the input associated with the operation of a narrow-down button is discriminated. If the input contents are the input associated with the operation of the narrow-down button as a result of the discrimination, in step S925, information of a narrow-down attribute selected by the user is stored into the system memory 52 and the processing routine is returned to step S901.

If the input contents are not the input associated with the operation of the narrow-down button as a result of the discrimination of step S924, in step S926, whether or not the input contents are the input associated with the operation of a group display button is discriminated. If the input contents are the input associated with the operation of the group display button as a result of the discrimination, in step S927, the state of "ON" or "OFF" of a group display setting is changed and the processing routine is returned to step S901. If a plurality of groups exist and the group display setting is "ON", representative images may reproduced in a mode of sequentially reproducing only the representative images. In this case, when a representative image of the next group is displayed, after the elapse of a predetermined time, the representative image is selected from the next group and displayed.

If the input contents are not the input associated with the operation of the group display button as a result of the discrimination of step S926, in step S928, whether or not the input contents are the input associated with the operation of a resume reproduction button is discriminated. If the input contents are the input associated with the operation of the resume reproduction button as a result of the discrimination, in step S929, a resume reproduction setting is changed to the state of "ON" or "OFF" and the processing routine is returned to step S901. When the resume reproduction setting is "ON", a processing for obtaining and displaying the image file which is reproduced at the precedent time is executed in step S1805 in FIG. 18, which will be described hereinafter.

If the input contents are not the input associated with the operation of the resume reproduction button as a result of the discrimination of step S928, in step S930, whether or not the input contents are the input associated with the operation of a classification setting button is discriminated. If the input contents are the input associated with the operation of the classification setting button as a result of the discrimination, in step S931, classification information of the image file is changed and the processing routine is returned to step S901.

If the input contents are not the input associated with the operation of the classification setting button as a result of the discrimination of step S930 but are other input, in step S932, a processing corresponding to the other input is executed. For example, a processing such as switching to a multi reproduction, menu display by a menu button, or the like is executed and the processing routine is returned to step S901.

File Analyzation

Figure 10:
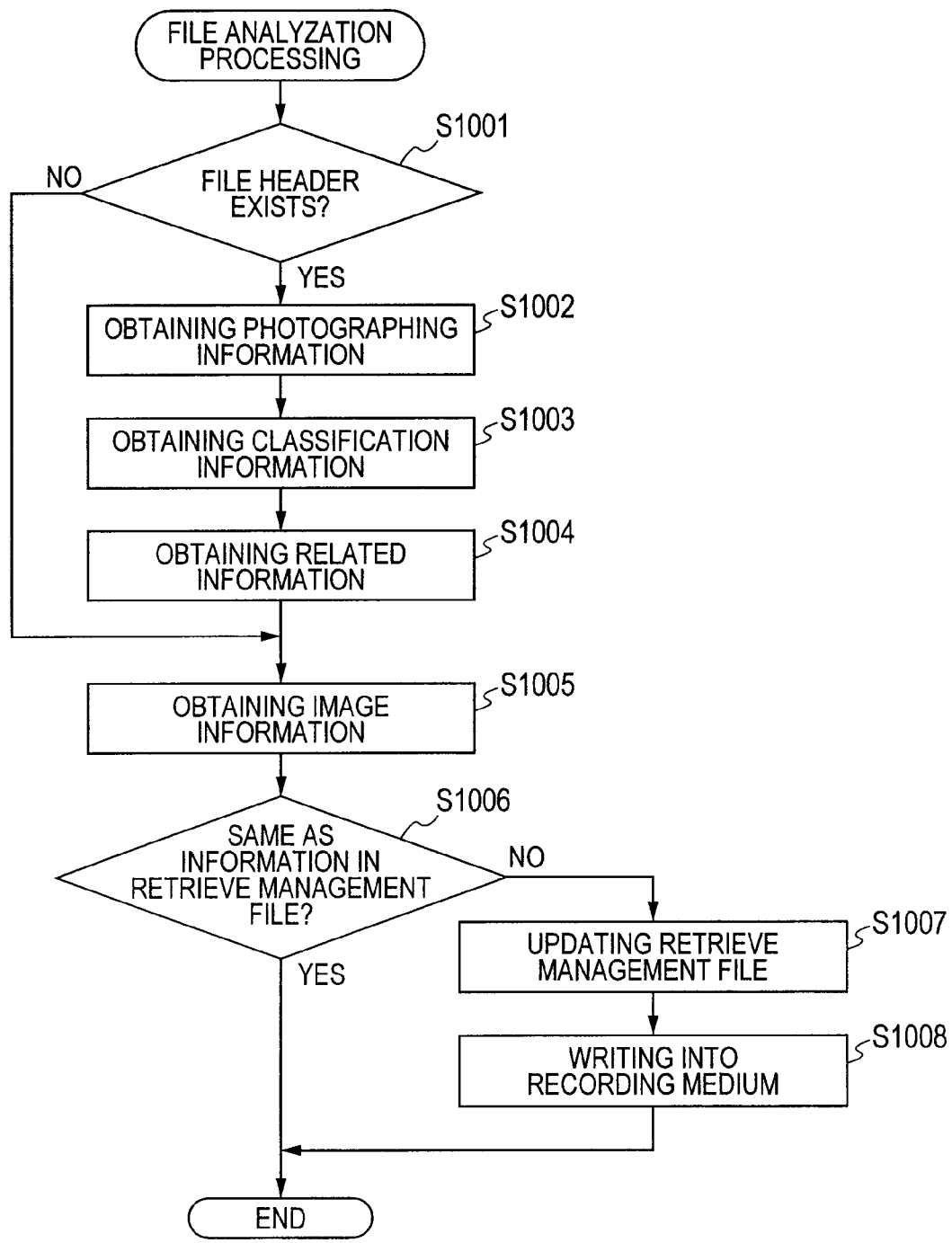
FIG. 10 is a flowchart illustrating an example of a detailed procedure of a file analyzation processing in step S804 in FIG. 8 and steps S908 and S921 in FIGS. 9A and 9B.

FIG. 10 is a flowchart illustrating an example of a detailed procedure of the file analyzation processing in step S804 in FIG. 8 and steps S908 and S921 in FIGS. 9A and 9B.

First, in step S1001, the system control unit 50 discriminates whether or not a file header in which attribute information such as photographing information, classification information, and the like is described exists in the analyzation subject image file. If such a file header exists as a result of the discrimination, in step S1002, the photographing information is obtained from the file header. In step S1003, the classification information and the like are obtained from the file header. Further, in step S1004, the related information and the like are obtained from the file header.

The photographing information is information regarding the photographing date and time and information such as a photographing mode and the like at the time of photographing. The classification information denotes identification information for use in an image retrieval, which is tag information or the like. The related information is information showing the image photographed by a series of photographing such as single/continuous photographing, stitch photographing, bracket photographing, continuous photographing mode, panorama photographing, 3D image photographing, and the like.

Subsequently, in step S1005, the system control unit 50 obtains information regarding a file format of the image and information of an image data main body such as image main body start position, image compression method, and the like which are extracted on the basis of the file format. In step S1006, the system control unit 50 discriminates whether or not the foregoing photographing information, classification information, image information, and the like are the same as the contents of a retrieve management file.

If they are the same contents as a result of the discrimination of step S1006, the processing is terminated as it is. If there is a difference between them as a result of the discrimination of step S1006, in step S1007, corresponding file information is updated in the retrieve management file. In step S1008, the retrieve management file is written into the recording medium 200 and the processing is terminated.

As mentioned above, in the case where the image file is read out and the file header is analyzed in order to display the image, by simultaneously making a collation on a file unit basis of the retrieve management file, detailed collation and correction of the retrieve management file can be performed without taking more processing time. Even if an alteration of the retrieve management file itself, a change in retrieve management file, or the like cannot be detected, the retrieve management file can be reconstructed to a correct value.

Reproduction Subject List Generation Processing

Figure 11:
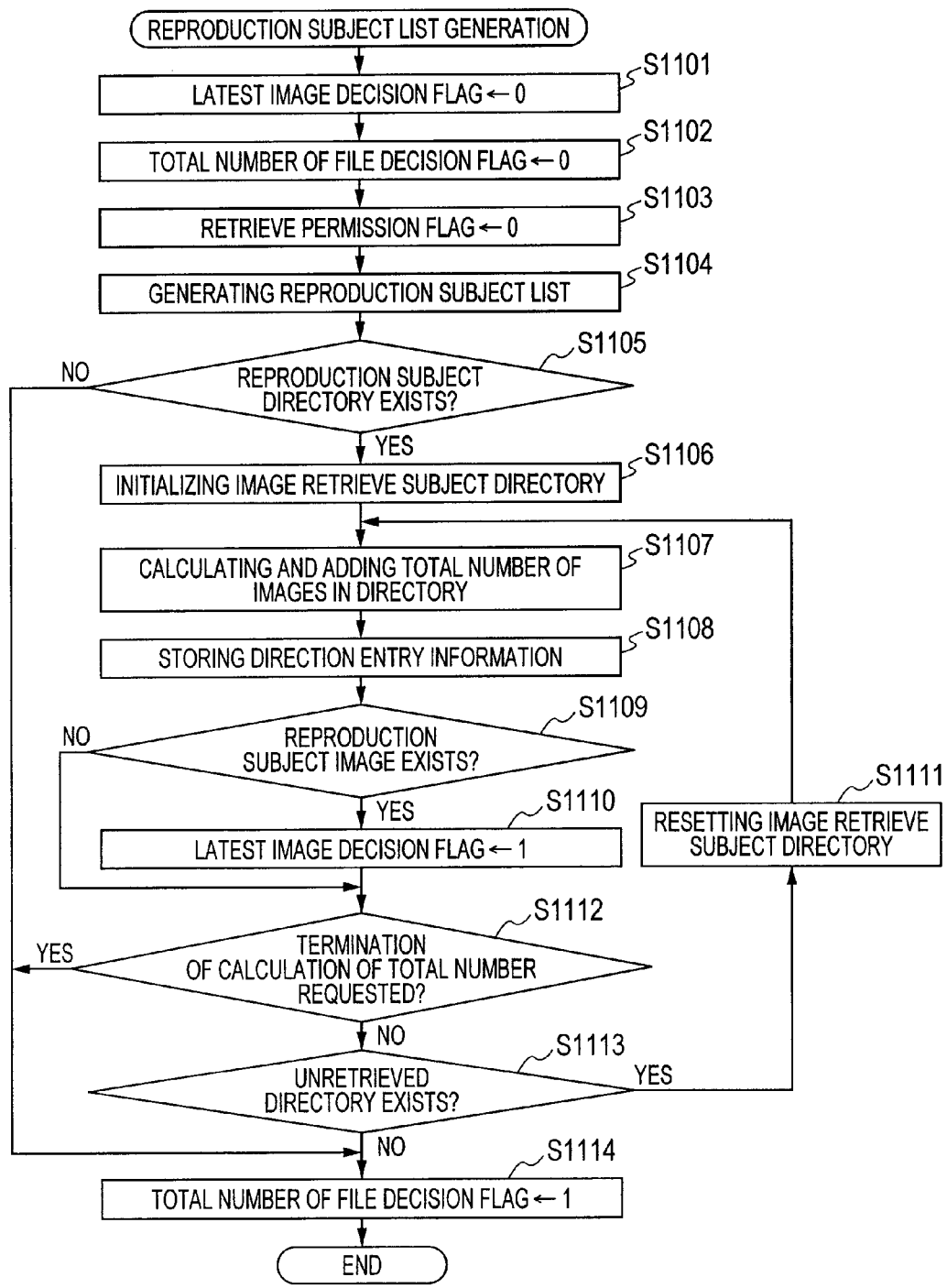
FIG. 11 is a flowchart illustrating an example of a procedure of a reproduction subject list generation processing which is started in a processing in step S806 in FIG. 8.

FIG. 11 is a flowchart illustrating an example of a procedure of the reproduction subject list generation processing which is started in the processing in step S806 in FIG. 8.

First, in step S1101, the system control unit 50 initializes a latest image decision flag to 0. The system control unit 50 initializes a total number of file decision flag to 0 in step S1102 and initializes a retrieve permission flag to 0 in step S1103.

Subsequently, in step S1104, the system control unit 50 generates the reproduction subject list. For example, in the reproducing apparatus which conforms with the DCF standard, this processing is such a processing that a directory entry of a DCF root directory is analyzed and the DCF root directory is retrieved and added to the reproduction subject list. In step S1105, the system control unit 50 discriminates whether or not a reproduction subject directory exists. If the reproduction subject directory does not exist as a result of the discrimination, it corresponds to a state where a directory which is accessibly processable by the digital camera 100 and a file which is accessibly processable does not exist. Therefore, in step S1114, the system control unit 50 sets the total number of files into 0 and sets the total number of file decision flag into 1, and the processing is terminated.

If the reproduction subject directory exists as a result of the discrimination of step S1105, the system control unit 50 initializes an image retrieve subject directory in step S1106. In this initialization, for example, in the reproducing apparatus which conforms with the DCF standard, a DCF directory of the maximum number is set to the image retrieve subject directory. Subsequently, in step S1107, the system control unit 50 analyzes the directory entry of the relevant directory, thereby calculating the total number of images in the directory set into the image retrieve subject. The total number of images in the directory is added to the total number of images in the recording medium 200.

Subsequently, in step S1108, the system control unit 50 obtains file information described in the directory entry of the DCF root directory. Specifically speaking, the system control unit 50 obtains information such as minimum file number, maximum file number, total sum of file numbers, total sum of time stamps, total sum of file sizes, total number of files, and the like. They are stored as directory entry information into the system memory 52.

Subsequently, in step S1109, whether or not the reproduction subject image file (that is, file which is accessibly processable by the digital camera 100) exists is discriminated. If the reproduction subject image file exists as a result of the discrimination, in step S1110, the system control unit 50 decides the latest image and sets the latest image decision flag into 1. If the reproduction subject image file does not exist as a result of the discrimination of step S1109, step S1112 follows. The terminate button or the like is operated and whether or not there is an instruction of termination of the calculation of the total number is discriminated. If there is the instruction of termination of the calculation of the total number as a result of the discrimination, step S1114 follows. The system control unit 50 interrupts the processing and exits the processing routine.

If there is not the instruction of termination of the calculation of the total number as a result of the discrimination of step S1112, whether or not an unretrieved directory exists is discriminated in step S1113. If the unretrieved directory exists as a result of the discrimination, in step S1111, the image retrieve subject directory is set to an unprocessed directory and the processing routine is returned to step S1107. In this manner, the processings of steps S1107 to S1110 are executed to all of the directories existing on the reproduction subject list generated in step S1104.

If the unretrieved directory does not exist as a result of the discrimination of step S1113, in step S1114, the system control unit 50 notifies the apparatus of the latest image decision, calculates the total number of images, sets the total number of file decision flag, and exits the processing routine. It is assumed that even if the reproduction subject directory exists, when the reproduction subject image file does not exist in the directory, the total number of images is set to 0, the total number of file decision flag is turned on, and the system control unit 50 exits the processing routine.

Generation of Retrieve Management File

Figure 12:
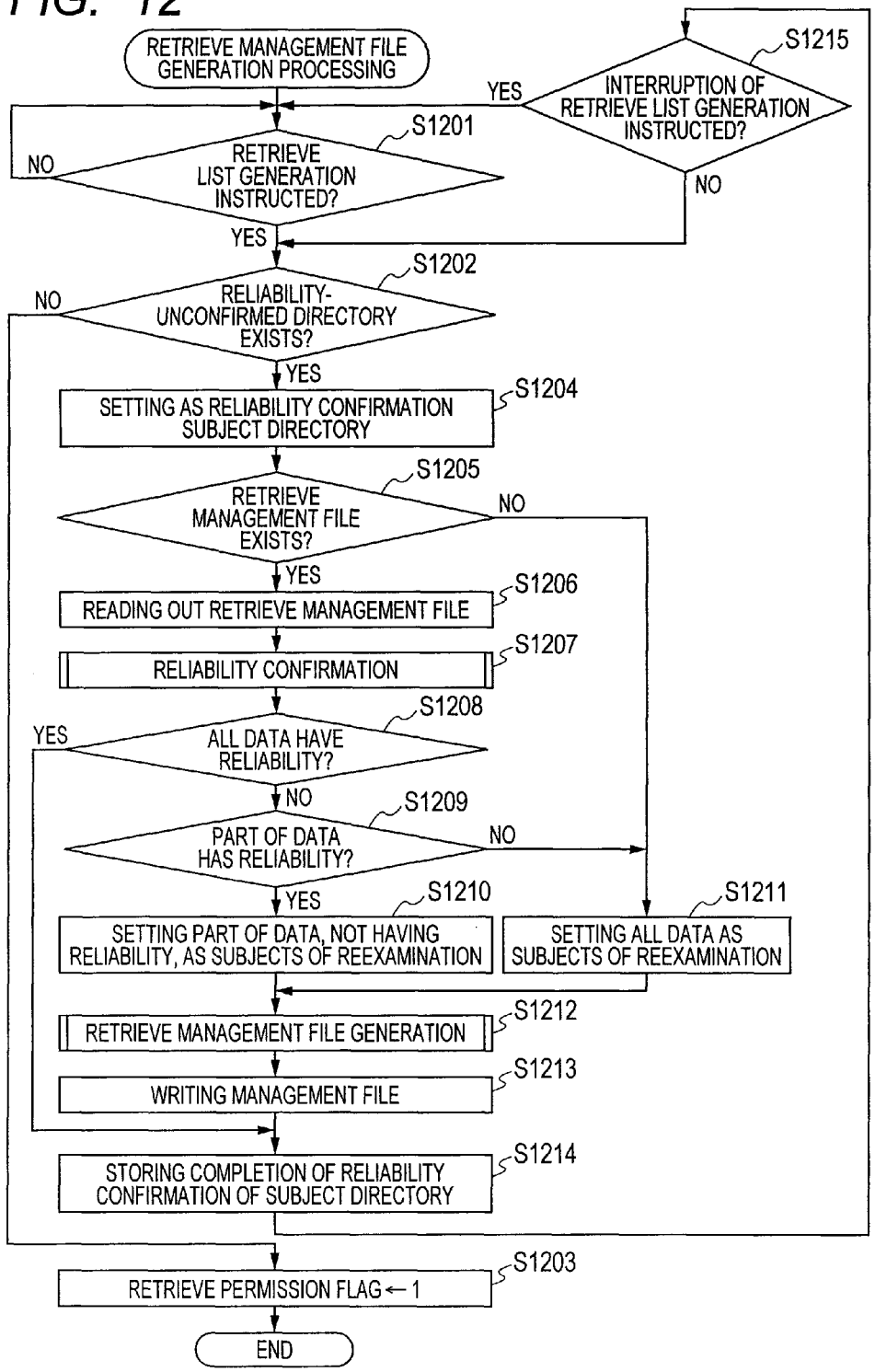
FIG. 12 is a flowchart illustrating an example of a procedure of a retrieve management file generation processing which is started in step S808 in FIG. 8.

FIG. 12 is a flowchart illustrating an example of a procedure of the retrieve management file generation processing which is started in step S808 in FIG. 8.

First, in step S1201, the apparatus waits until an instruction to generate the retrieve management file is received.

When the instruction to generate the retrieve management file is received, in step S1202, the system control unit 50 discriminates whether or not a directory in which the reliability is not confirmed yet exists. If the reliability is confirmed with respect to all of the reproduction subject directories as a result of the discrimination, in step S1203, a retrieve permission flag=1 is set into the system memory 52 and the processing is terminated.

If the directory in which the reliability is not confirmed yet exists as a result of the discrimination of step S1202, in step S1204, such a directory is set to the subject directory in which the reliability should be confirmed. In step S1205, the system control unit 50 discriminates whether or not the retrieve management file corresponding to the subject directory is recorded in the recording medium 200. If the retrieve management file is recorded in the recording medium 200 as a result of the discrimination, in step S1206, the retrieve management file is read out of the recording medium 200 and stored into the system memory 52.

Subsequently, in step S1207, the system control unit 50 confirms the reliability to the retrieve management file which is read out in step S1206. Details of the processing for confirming the reliability will be described hereinafter. In step S1208, whether or not the reliability exists in all of the data in the retrieve management file is discriminated. If the reliability exists in all of the data as a result of the discrimination, step S1214 follows.

If the reliability does not exist in at least a part of the data as a result of the discrimination of step S1208, in step S1209, whether or not the reliability exists in a part of the data is discriminated. If the reliability does not exist in all of the data as a result of the discrimination, in step S1211, the system control unit 50 sets all of the data in the directory as the subjects of reexamination.

If the reliability exists only in a part of the data as a result of the discrimination of step S1209, in step S1210, the system control unit 50 sets the partial data in which the reliability is not confirmed, as a reexamination subject. In step S1212, a retrieve management file is generated with respect to the file which is set as the reexamination subject.

Figure 13A:
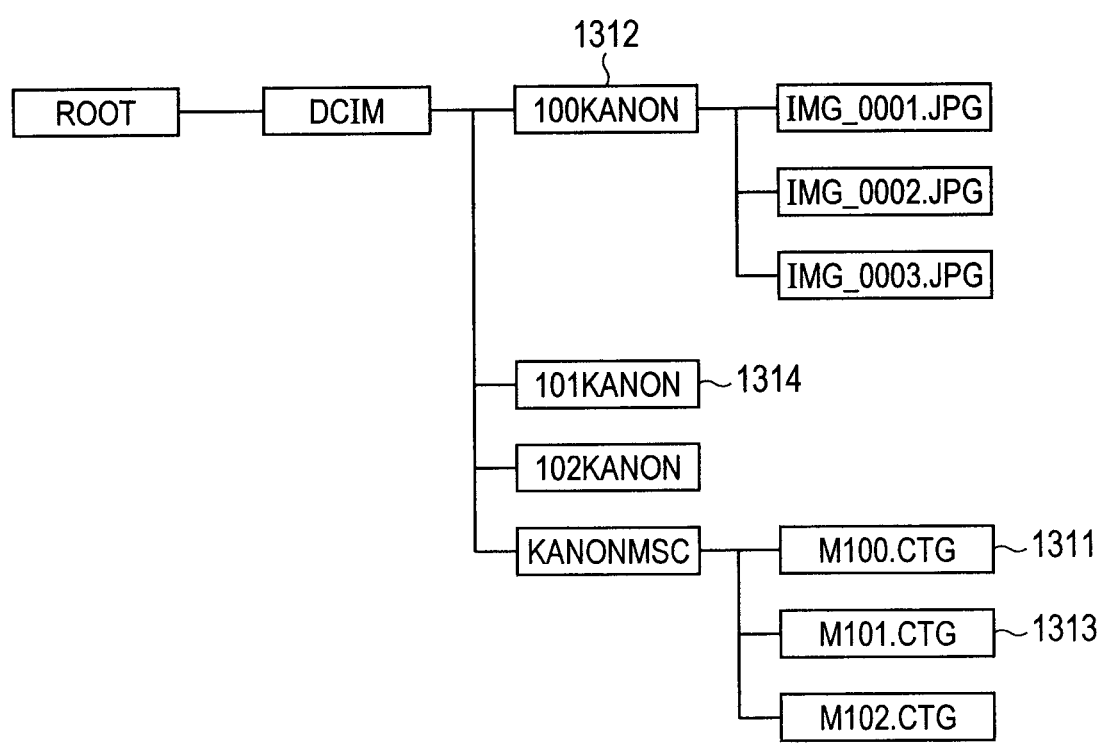
FIGS. 13A and 13B are diagrams illustrating a construction of a directory and a structural example of the retrieve management file.

Subsequently, in step S1213, the system control unit 50 writes the generated retrieve management file into the recording medium 200. For example, as illustrated in FIG. 13A, a directory "XXXMSC" to store the retrieve management file is generated and the generated retrieve management file ("M100.CTG" 1311, "M101.CTG" 1313) is stored into the directory. In the embodiment, a retrieve management file is generated every directory. For example, "M100.CTG" 1311 is set to a retrieve management file of a directory "100XXX" 1312, and "M101.CTG" 1313 is set to a retrieve management file of a directory "101XXX" 1314.

Subsequently, in step S1214, completion of the reliability of the relevant directory is stored into the system memory 52 and step S1215 follows. In step S1215, whether or not there is an instruction to interrupt the generation of the retrieve management file is discriminated. If there is the interruption instruction as a result of the discrimination, the processing routine is returned to step S1201 and the apparatus waits until the instruction to generate the retrieve management file is input again. If there is not the instruction to interrupt the generation of the retrieve management file as a result of the discrimination of step S1215, step S1202 follows and the foregoing series of processings are continued until the directory in which the reliability is not confirmed yet does not exist.

Reliability Confirmation Processing

Figure 13B:
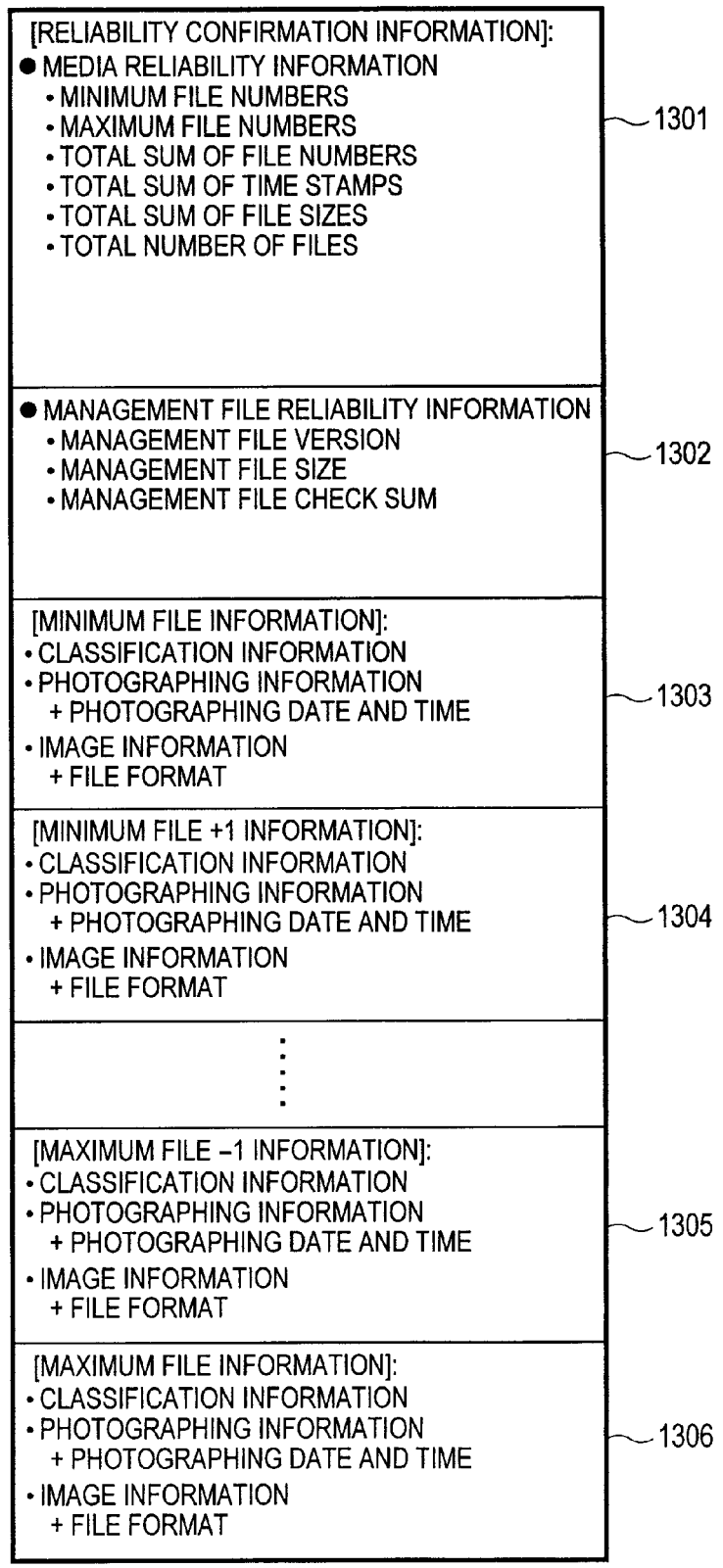
Figure 14:
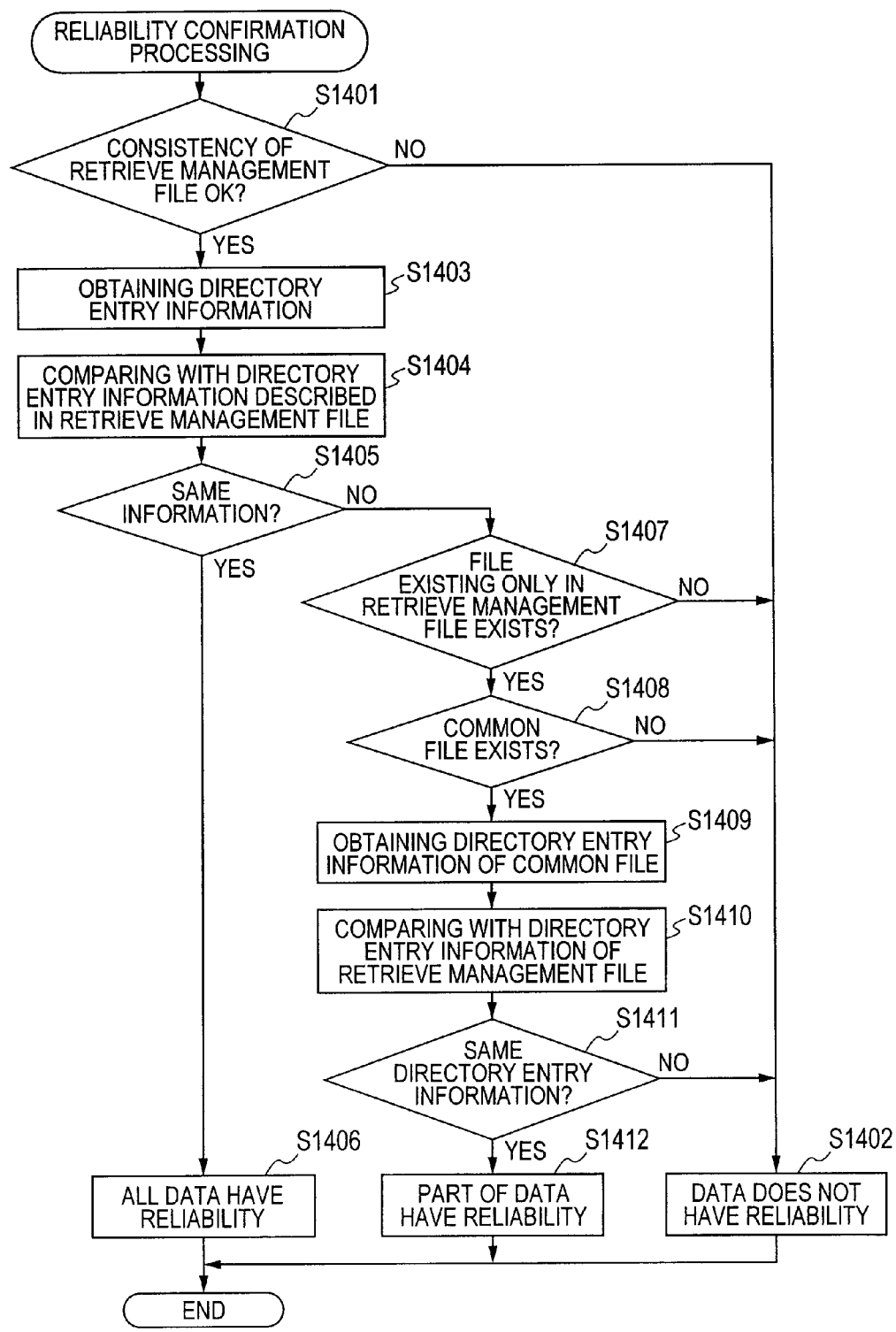
FIG. 14 is a flowchart illustrating an example of a detailed processing procedure for confirming a reliability in step S1207 in FIG. 12.

FIG. 14 is a flowchart illustrating an example of a detailed processing procedure for confirming the reliability in step S1207 in FIG. 12. FIG. 13B is a diagram illustrating an example of the retrieve management file according to the embodiment.

First, in step S1401, the system control unit 50 confirms a consistency of the retrieve management file which is read out of the recording medium 200 and stored into the system memory 52 in step S1206 in FIG. 12. The confirmation of the consistency is performed on the basis of management file reliability information 1302 illustrated in FIG. 13B.

As illustrated in FIG. 13B, the management file reliability information 1302 is information regarding the consistency of the retrieve management file itself, that is, information such as management file version, management file size, and management file check sum and is used for confirmation about the presence or absence of alteration of the retrieve management file itself. As management file reliability information 1302, further, a time stamp, a Hash value, or the like can be used.

If the consistency cannot be confirmed as a result of the confirmation in step S1401, in step S1402, it is determined that the data does not have the reliability, and the processing is terminated. As mentioned above, such a situation that since the retrieve management file is altered, the normal retrieval cannot be performed can be prevented.

If the consistency of the retrieve management file could be confirmed as a result of the confirmation in step S1401, step S1403 follows. In step S1403, the system control unit 50 obtains the directory entry information stored in the system memory 52 in step S1108 in FIG. 11. In step S1404, the system control unit 50 compares the directory entry information described in the retrieve management file which is read out of the recording medium 200 in step S1206 in FIG. 12, with the directory entry information obtained in step S1403.

In this processing, the compression is performed by using the information showing a construction of the subject directory such as minimum file number, maximum file number, total sum of file numbers, total sum of time stamps, total sum of file sizes, and total number of files in reliability confirmation information 1301 illustrated in FIG. 13B. Although the file number is used as entry information by presuming the DCF standard in the embodiment, the total sum of file names or character codes of the file names, a Hash value of the directory entry in the recording medium, and the like may be used as directory entry information.

In step S1405, whether or not both of the above information are the same is discriminated. If both of the above information coincide as a result of the discrimination, in step S1406, the system control unit 50 determines that all of the data have the reliability, and the processing is terminated. Thus, such a situation that the normal retrieval cannot be performed due to the change in file itself in the subject directory or the change in file construction can be prevented.

If both of the information are not the same as a result of the discrimination of step S1405, step S1407 follows. In step S1407, the system control unit 50 discriminates whether or not a file existing only in the retrieve management file exists. If the file existing only in the retrieve management file exists as a result of the discrimination, step S1402 follows.

If the file existing only in the retrieve management file does not exist as a result of the discrimination of step S1407, step S1408 follows. In step S1408, the system control unit 50 discriminates whether or not a common file existing in both of the directory entry information in the retrieve management file and the directory entry information obtained in step S1403 exists. If the common file does not exist as a result of the discrimination, the processing routine advances to step S1402 mentioned above.

If the common file exists as a result of the discrimination of step S1408, in step S1409, a portion of the common file of the directory entry information is obtained from the recording medium 200. In step S1410, the portion of the common file of the directory entry information is compared with the directory entry information described in the retrieve management file. In the comparison using the directory entry information, a time stamp, a file size, a file name, a protected attribute, a hidden attribute, an archive attribute, and the like can be used.

In step S1411, whether or not the directory entry information is the same in the common file is discriminated. If the directory entry information is the same in the common file as a result of the discrimination, in step S1412, the system control unit 50 determines that a part of the data has the reliability, and the processing is terminated. For example, there is a case where an image file is added to the recording medium 200 by an external apparatus and a power supply cut-off or the like is performed before photographed image information of the image file added to the recording medium 200 is reflected to the retrieve management file of the photographed image information in the digital camera 100. In such a case, such a situation that the information of only a partial file is not described in the retrieve management file occurs. According to the present embodiment, even in such a case, the data which is already determined as data having the reliability can be effectively used.

If the directory entry information in the portion of the common file is not the same as a result of the discrimination of step S1411, in step S1402 mentioned above, it is determined that the data does not have the reliability, and the processing is terminated.

According to the foregoing retrieve management processing, by detecting the change in construction of the retrieve management file recorded in the recording medium 200 or the change in retrieve management file itself, the retrieve management file can be automatically reconstructed. As mentioned above, in steps S1403 and S1404, the change in construction of the retrieve management file recorded in the recording medium 200 or the change in management subject file is detected on the basis of the directory entry information. Therefore, the detection processing can be executed at a high speed without referring to the contents of the file.

According to the reconstruction of the retrieve management file, the reconstruction is performed only to the directory in which the change in construction of the retrieve management file recorded in the recording medium 200 or the change in retrieve management file itself is detected. Therefore, as shown in steps S1204 to S1213 in FIG. 12, to the directory which is not changed, there is no need to reconstruct the retrieve management file.

As shown in steps S1210 and S1212 in FIG. 12 and steps S1409 to S1412 in FIG. 14, if there are no changes with respect to the common file, the information of the retrieve management file of the common file is used as it is. Therefore, even in the case where a file is added to the directory by the external apparatus, the case where the power source of the apparatus is turned off before the file is added to the directory by the apparatus and the retrieve management file is updated, or the like, the retrieve management file which is already constructed can be effectively used. According to the reconstruction of the retrieve management file, if there are no changes in the common file, the reconstruction is performed only to the retrieve management file which does not overlap among the directories in which the change in construction of the retrieve management file recorded in the recording medium 200 or the change in retrieve management file itself is detected. Therefore, there is no need to reconstruct with respect to the file information which is already constructed, and only the file in which the addition was detected can be reexamined.

According to the confirmation of the reliability, as shown in the management file reliability information 1302 in FIG. 13B, the file attribute is described in the retrieve management file and is also collated (step S1401 in FIG. 14). Thus, the alteration of the retrieve management file itself can be detected and such a situation that the erroneous management is performed can be prevented. Since the alteration of the retrieve management file itself is performed on the basis of the information on the directory of the retrieve management file itself, the confirmation can be performed on a file unit basis at a high speed.

Generation of Retrieve Management File

Figure 15:
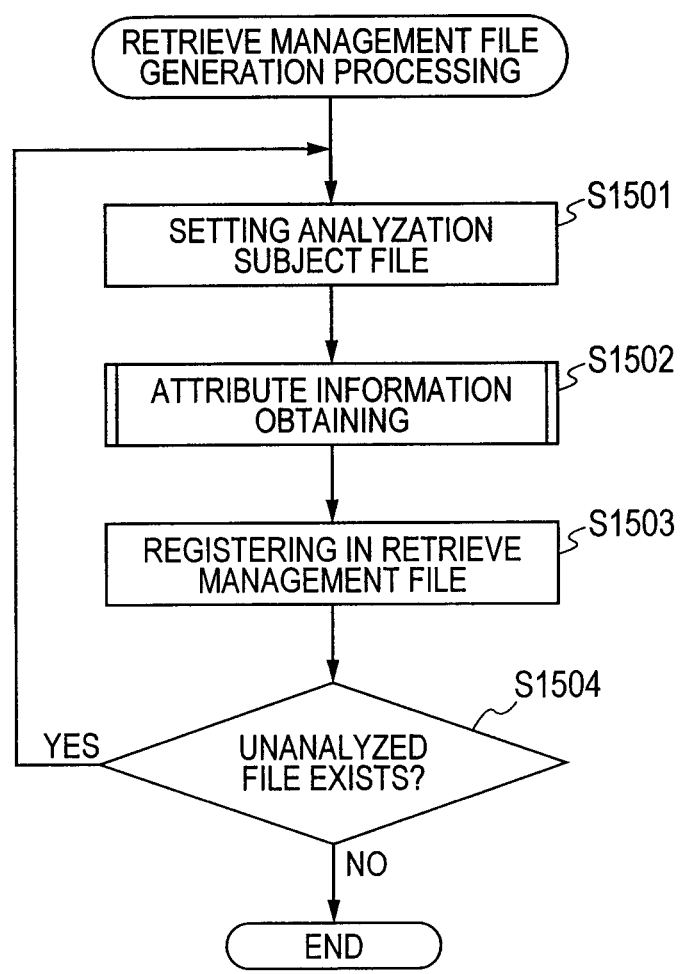
FIG. 15 is a flowchart illustrating an example of a specific processing procedure for generating the retrieve management file in step S1212 in FIG. 12.

FIG. 15 is a flowchart illustrating an example of a procedure of the generation processing of the retrieve management file in step S1212 in FIG. 12. The generation processing of the retrieve management file will be described hereinbelow with reference to the flowchart illustrated in FIG. 15 and the retrieve management file illustrated in FIG. 13B.

First, in step S1501, the system control unit 50 sets an analyzation subject file. The file which is subjected to the setting is an unanalyzed file among all of the files in the directory set by the retrieve management file generation processing illustrated in FIG. 12 mentioned above or among a part of the files in which the reliability cannot be confirmed.

Subsequently, in step S1502, the system control unit 50 obtains attribute information of the analyzation subject file. Details of the processing for obtaining the attribute information will be described hereinafter. Subsequently, in step S1503, the information which is described in the retrieve management file is generated and registered into the retrieve management file. As shown in a file 1303 in FIG. 13B, the information includes classification information, photographing information, photographing object information, and the like and is stored in association with information which specifies the file. As information which specifies the file, a file name, a file number, and the like may be described in the list. The information may be associated with the file in accordance with layout order of the list. Even if it is determined by attribute information obtaining processing, which will be described hereinafter, that there is no file header, the system control unit 50 describes information showing such a fact into the retrieve management file.

As mentioned above, the attribute information of the analyzation subject file is registered into the retrieve management file in step S1503. In step S1504, the system control unit 50 confirms the presence or absence of the unanalyzed file. If the unanalyzed file exists as a result of the confirmation, the processing routine is returned to step S1501. If the unanalyzed file does not exist, the processing is terminated.

Since such an operation that the file in the recording medium 200 is read out and the attribute information is analyzed is not executed as mentioned above, the retrieve management file can be constructed at a high speed.

According to the foregoing reliability confirmation processing, for example, in the case where the classification information setting processing (step S931) and the image deletion processing (step S917) illustrated in FIGS. 9A and 9B are executed before the reliability is confirmed, the subject image file can be removed from the management subject. That is, in the file management processing, the subject image file is removed from the subject of the image files which are managed in the present system.

When the image file in the recording medium 200 is retrieved and the total number of images is determined, the classification information setting processing (step S932) and the image deletion processing (step S918) can be executed. During such a period of time, the reliability confirmation processing (step S1207) of the retrieve management file in the recording medium 200 operates in parallel with those processings.

First, a case where the image file is deleted before the reliability is confirmed will be described. In this case, the directory entry of the directory to which the image file belongs is updated in association with the deletion of the image file. Therefore, inconsistency occurs between the reliability confirmation information 1301 described in the retrieve management file and the directory entry. In the reliability confirmation processing in FIG. 14, the processing routine advances from step S1405 to step S1407. Since the deleted image file does not exist in the directory entry, the relevant image file exists only in the retrieve management file. Therefore, it is determined that the data of the retrieve management file does not have the reliability (step S1209). All of the data is set to the reexamination subjects and the retrieve management file is generated (step S1211 and S1212).

Subsequently, a case where the classification information is changed with respect to the image file before the reliability is confirmed will be described. Also in this case, a directory entry (time stamp and the like) of the directory to which the relevant image file belongs is updated in association with the change in classification information of the image file. Therefore, inconsistency occurs between the reliability confirmation information 1301 described in the retrieve management file and the directory entry. In the reliability confirmation processing in FIG. 14, the processing routine advances from step S1405 to step S1407. Since the image file is not deleted according to the change in classification information, the image file existing only in the retrieve management file does not occur. However, since the classification information is changed, with respect to the relevant image file, inconsistency occurs between the directory entry and the image file existing in common in the retrieve management file. Therefore, the processing routine advances from step S1411 to step S1402 and it is determined that the data of the retrieve management file does not have the reliability. Thus, all of the data is set to the reexamination subjects and the retrieve management file is generated (step S1211 and S1212).

In the case where the image is deleted or the classification information is changed before the reliability is confirmed as mentioned above, such an image file is removed from the subject of the image files which are managed in the present system.

Obtainment of Attribute Information

Figure 16:
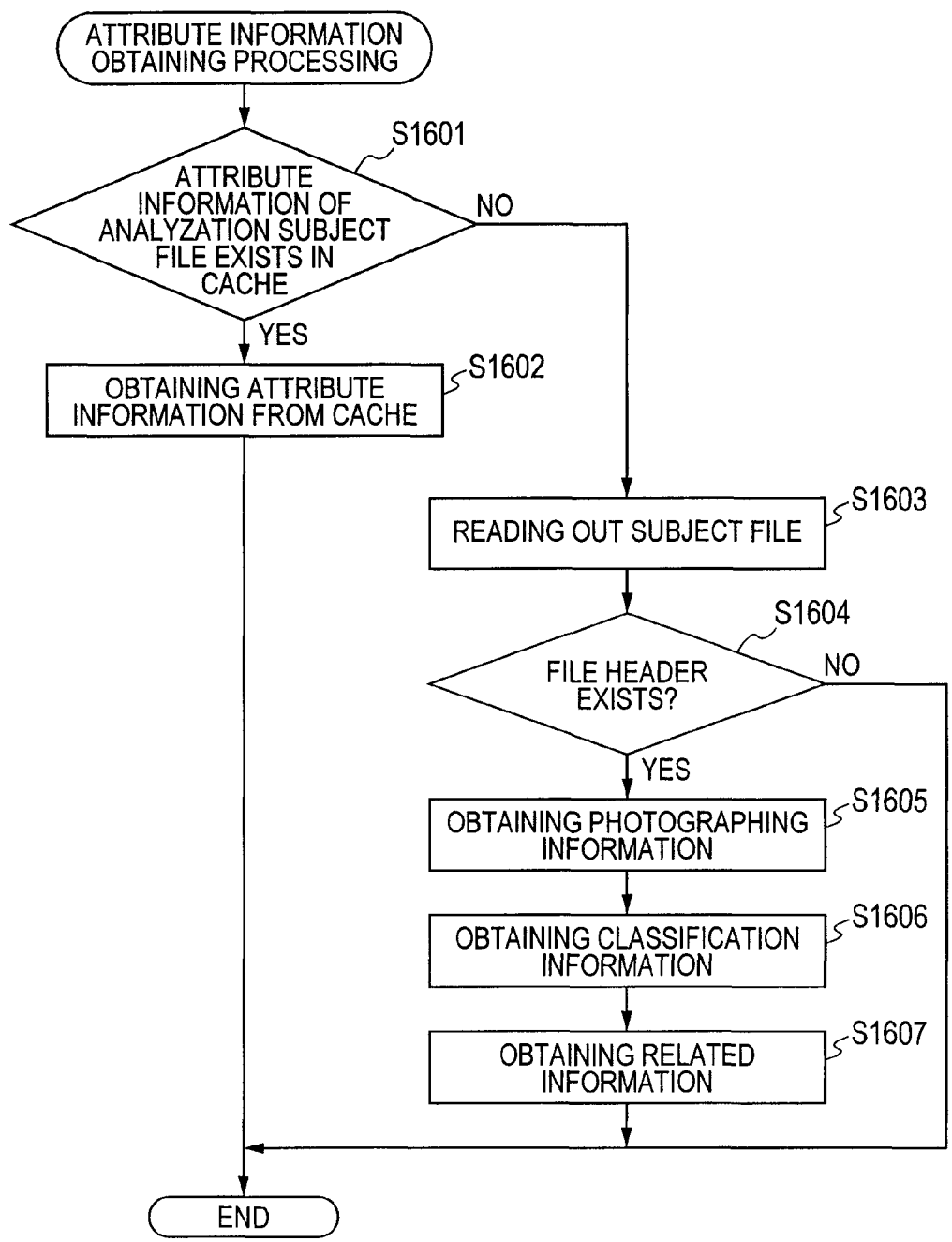
FIG. 16 is a flowchart illustrating an example of a processing procedure for obtaining attribute information in step S1502 in FIG. 15.

FIG. 16 is a flowchart illustrating an example of a processing procedure for obtaining the attribute information in step S1502 in FIG. 15.

First, in step S1601, the system control unit 50 discriminates whether or not the attribute information of the file set as an analyzation subject in step S1501 in FIG. 15 exists in a cache area in the system memory 52. The attribute information in this instance is held in the cache area in the system memory 52, for example, when the image is photographed. If the attribute information exists as a result of the discrimination, in step S1602, the attribute information which is described in the retrieve management file is obtained from the cache area.

If the attribute information does not exist in the cache area as a result of the discrimination of step S1601, in step S1603, the system control unit 50 reads out the analyzation subject file from the recording medium 200. In step S1604, whether or not a file header in which the attribute information is described exists in the file is discriminated. If the file header does not exist as a result of the discrimination, the processing is terminated as it is.

If the file header exists as a result of the discrimination of step S1604, in step S1605, the photographing information is obtained from the file header. The classification information is obtained in step S1606. The related information is obtained in step S1607.

Image Display Processing

Figure 17:
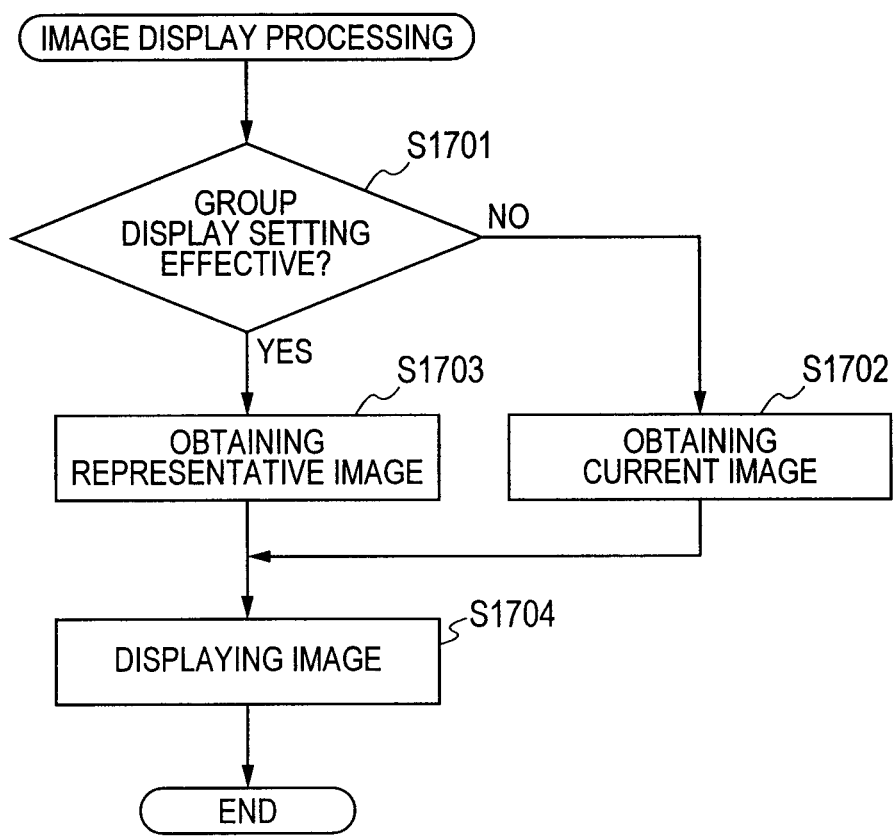
FIG. 17 is a flowchart illustrating an example of a processing procedure for displaying an image in step S805 in FIG. 8 and steps S910 and S923 in FIGS. 9A and 9B.

FIG. 17 is a flowchart illustrating an example of a processing procedure for displaying an image in step S805 in FIG. 8 and steps S910 and S923 in FIGS. 9A and 9B.

First, in step S1701, the system control unit 50 obtains information of the group display setting from the system memory 52 and discriminates whether or not group display setting is effective. If the group display setting is ineffective as a result of the discrimination, the system control unit 50 selects the current image file from the memory 32 in step S1702 and displays the image in step S1704.

If the group display setting is effective as a result of the discrimination of step S1701, the system control unit 50 selects representative image data decided by a processing of FIG. 19, which will be described hereinafter, from the memory 32 in step S1703 and displays the representative image in step S1704.

Original image information obtaining processing

Figure 18:
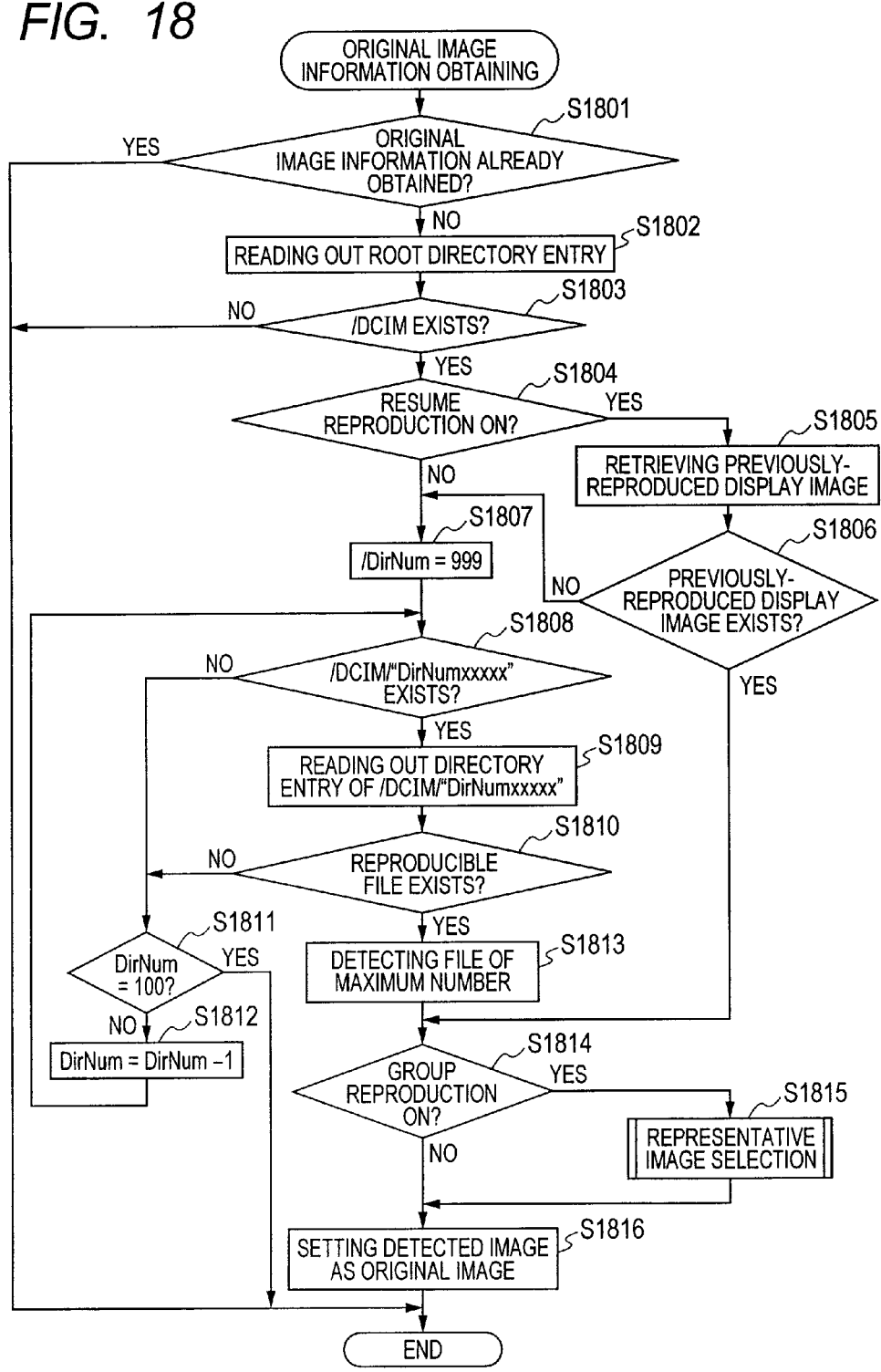
FIG. 18 is a flowchart illustrating an example of a processing procedure for obtaining original image information in step S801 in FIG. 8.

FIG. 18 is a flowchart illustrating an example of a processing procedure for obtaining the original image information in step S801 in FIG. 8.

First, in step S1801, the system control unit 50 discriminates whether or not the original image information is already obtained. If the original image information is already obtained as a result of the discrimination, the system control unit 50 terminates the processing as it is.

If the original image information is not obtained yet as a result of the discrimination of step S1801, in step S1802, the system control unit 50 reads out a root directory entry from the recording medium 200. Subsequently, in step S1803, the root directory read out in step S1802 is analyzed and the presence or absence of a "/DCIM" directory is discriminated. If the "/DCIM" directory does not exist as a result of the discrimination, the system control unit 50 determines that there are no reproduction images, and exits the present processing routine. If the "/DCIM" directory exists as a result of the discrimination of step S1803, in step S1804, the system control unit 50 discriminates whether or not a resume reproduction setting is "ON". In this processing, it is discriminated on the basis of the resume reproduction setting set in step S929 in FIGS. 9A and 9B mentioned above.

If the resume reproduction setting is "ON" as a result of the discrimination, in step S1805, the system control unit 50 retrieves the image file which is reproduced at the precedent time. In step S1806, the system control unit 50 discriminates whether or not the image file which is reproduced at the precedent time could be retrieved. If the image file could be retrieved as a result of the discrimination, the image file is read out and step S1814 follows. If the image file could not be retrieved, step S1807 follows.

If the resume reproduction setting is "OFF" as a result of the discrimination of step S1804, in step S1807, the system control unit 50 reads out the "/DCIM" directory and sets a retrieve directory number into "999" a maximum value on the DCF standard.

Subsequently, in step S1808, whether or not a corresponding directory/DCIM/"DirNumxxxxx" exists is discriminated. If the corresponding directory exists as a result of the discrimination, the system control unit 50 reads out this directory entry in step S1809 and discriminates the presence or absence of the reproducible image file in step S1810. For example, if DirNum is equal to "100", /DCIM/ "DirNumxxxxx" is /DCIM/"100xxxxx" and xxxxx indicates half-width alphanumeric characters of ASCII of 5 characters.

If the reproducible image file does not exist as a result of the discrimination of step S1810, in step S1811, the system control unit 50 discriminates whether or not DirNum is equal to "100" as a minimum value on the DCF standard. If DirNum is equal to "100" as a result of the discrimination, the system control unit 50 terminates the retrieval. If DirNum is equal to a value other than "100", a directory whose DirNum is smaller by one is retrieved.

If the reproducible image file exists as a result of the discrimination of step S1810, in step S1813, the system control unit 50 detects the image file of the maximum number among the reproducible image files from the relevant directory and reads out the image file. In step S1814, whether or not the group display setting is "ON" is discriminated. This discrimination is made on the basis of the group display setting set by the system control unit 50 in step S927 in FIGS. 9A and 9B mentioned above. If the group display setting is "ON" as a result of the discrimination, in step S1815, the system control unit 50 executes a representative image selection processing. This processing is similar to the processing of step S909 in FIGS. 9A and 9B. In step S1816, the selected representative image is set as an original image and the processing is terminated.

If the group display setting is "OFF" as a result of the discrimination of step S1814, in step S1816, the system control unit 50 sets the image file of the maximum number detected in step S1813 as an original image, and the processing is terminated.

Representative Image Selection Processing

Figure 19:
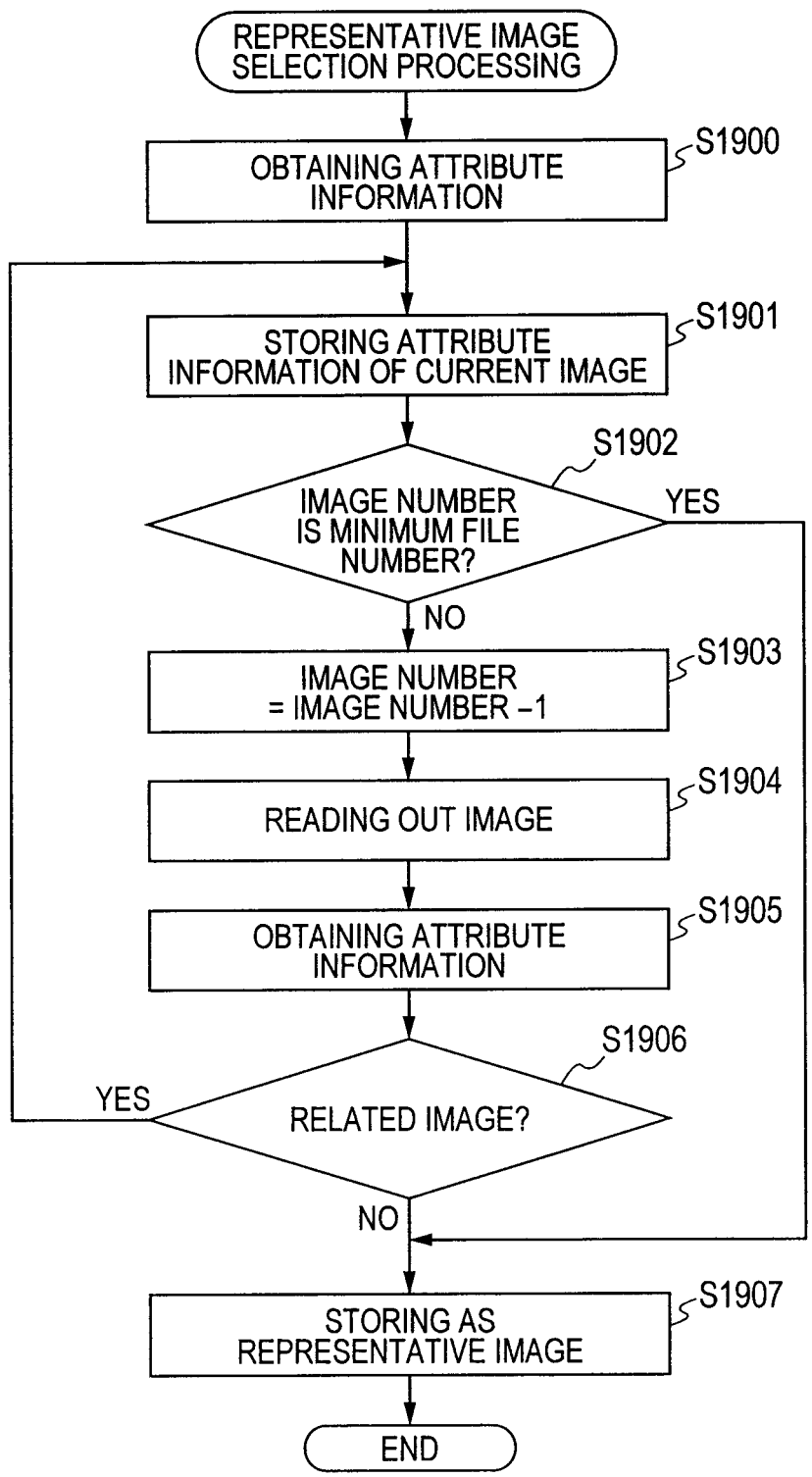
FIG. 19 is a flowchart illustrating an example of a processing procedure for selecting a representative image in the first embodiment.

FIG. 19 is a flowchart illustrating an example of a processing procedure for selecting the representative image in steps S909 and S922 in FIGS. 9A and 9B and step S1815 in FIG. 18 in the present embodiment.

First, in step S1900, the system control unit 50 obtains the photographing information, classification information, and related information as attribute information with respect to the current read-out image file.

The current read-out image file mentioned here is the image file read out in step S903 by the image feeding in the case of the processing of step S909 and is the image file read out in step S920 after the deletion of the image in the case of the processing of step S922. In the case of the processing of step S1818, the current read-out image file is the image file which is reproduced at the precedent time as a resume reproduced image file or the image file of the maximum number file of the maximum directory.

The foregoing photographing information, classification information, and related information are included in the attribute information. The photographing information is photographing date and time information stored in DateTime 706 in FIG. 7B and information such as a photographing mode and the like at the time of photographing as other information 710. The classification information is identification information which is stored in ClassInformation 708 in FIG. 7B and is used for image retrieval. For example, the classification information is tag information or the like. The related information is information corresponding to RelationInformation 709 illustrated in FIG. 7B. For example, the related information is information showing the images which are sequentially photographed by a series of photographings, such as an image number or the like showing a relation among the images. The series of photographings are, for example, the single\continuous photographing, stitch photographing, bracket photographing, continuous photographing mode, panorama photographing, 3D image photographing, and the like.

Subsequently, in step S1901, the system control unit 50 temporarily stores the attribute information obtained in step S1900 into the system memory 52. In step S1902, the system control unit 50 discriminates whether or not the image number of the read-out image file is the minimum number. If it is the minimum number as a result of the discrimination, in step S1907, the system control unit 50 stores the image file of the image number which is read out at present into the memory 32 as representative image data. The processing is terminated.

If the image number is not the minimum number as a result of the discrimination of step S1902, the system control unit 50 decreases a count value of a counter showing the image number, by 1 in step S1903 and reads out the closest image file having a smaller image number in step S1904. In step S1905, the attribute information is obtained in a manner similar to that in step S1900.

Subsequently, in step S1906, the system control unit 50 discriminates whether or not the image file which is read out at one-precedent time is associated with the image file which is read out immediately before in step S1904. This discrimination may be performed by the image number showing the relation described in the related information between the images as mentioned above or by the photographing mode information of the photographing information. Or, it is also possible to determine that the one-precedent image file is associated with the image file which is read out immediately before only in the case where all of the photographing mode, classification information, and related information in the photographing information coincide.

If they are associated as a result of the discrimination, the processing routine is returned to step S1901. The system control unit 50 stores the attribute information of the image file which is read out at present in step S1904 into the system memory 52. In this manner, the processing is repeated until the image file whose image number is equal to the minimum number in step S1902 or the image file which is not the related image is detected.

If they are not associated as a result of the discrimination of step S1906, in step S1907, the system control unit 50 stores the image file having the attribute information stored in the system memory 52 in step S1901 into the memory 32 as representative image data. The processing is terminated.

As mentioned above, according to the present embodiment, the representative image data is detected by comparing the attribute information of the images. When the foregoing processing is executed in step S1815 in FIG. 18, the system control unit 50 sets the representative image data as an original image in step S1816. The representative image is displayed in step S805 in FIG. 8.

Second Embodiment

The second embodiment of the invention will be described hereinbelow. In the present embodiment, a processing to select the representative image differs from that in the first embodiment. Since other processings and construction are similar to those illustrated in FIGS. 1 to 18 described in the first embodiment, their description is omitted.

Representative Image Selection Processing

Figure 20:
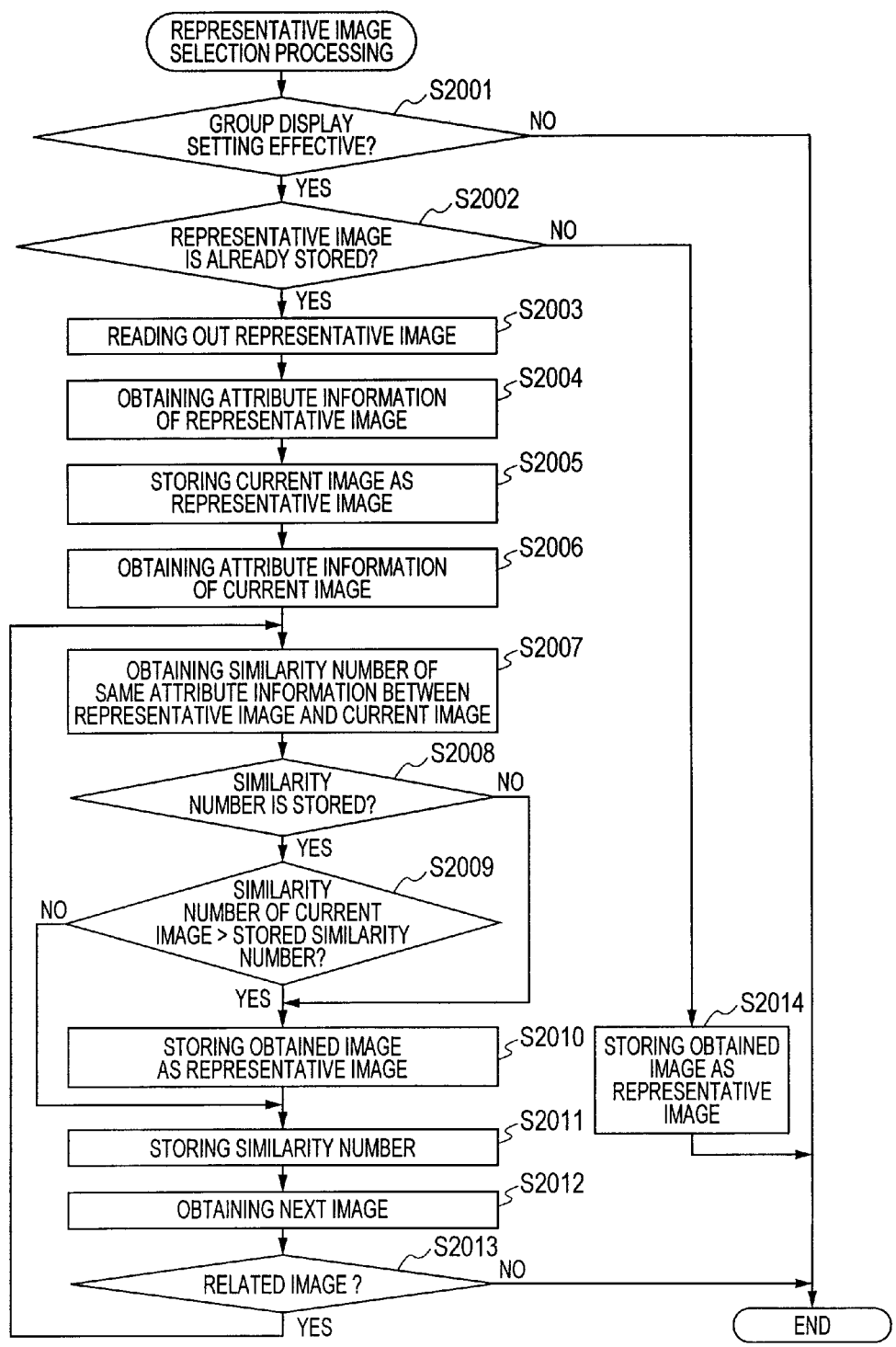
FIG. 20 is a flowchart illustrating an example of a processing procedure for selecting a representative image in the second embodiment.

FIG. 20 is a flowchart illustrating an example of a processing procedure for selecting the representative image in steps S909 and S922 in FIGS. 9A and 9B and step S1815 in FIG. 18 in the second embodiment.

First, in step S2001, the system control unit 50 discriminates whether or not the group display setting is "ON". If the group display setting is "OFF" as a result of the discrimination, since the representative image data is not stored, the system control unit 50 terminates the representative image selection processing as it is.

If the group display setting is "ON" as a result of the discrimination of step S2001, in step S2002, the system control unit 50 discriminates whether or not the representative image data is already stored in the memory 32. For example, if the image deletion processing is executed in step S917 in FIGS. 9A and 9B, the representative image data is still held in the storage state. If it is determined that the image feeding is instructed by the image feed button in step S902 in FIGS. 9A and 9B, the representative image data corresponding to the representative image displayed previously is also still held in the storage state.

If the representative image data is not stored as a result of the discrimination, in step S2014, the system control unit 50 stores the current read-out image file into the memory 32 as representative image data and terminates the representative image selection processing. The current read-out image file is similar to that described in step S1900 in FIG. 19.

If the representative image data is already stored as a result of the discrimination of step S2002, in step S2003, the system control unit 50 reads out the representative image data from the memory 32. Subsequently, in step S2004, the system control unit 50 obtains attribute information of the representative image data. In step S2005, the system control unit 50 stores the current read-out image file into the memory 32 as representative image data.

Subsequently, in step S2006, attribute information of the current read-out image file is obtained by a processing similar to that in step S1900 in FIG. 19. In step S2007, the system control unit 50 compares the attribute information obtained in step S2004 with the attribute information obtained in step S2006. Information showing a similarity number of the attribute information between the representative image data stored inherently and the current read-out image file is obtained. When the similarity number is calculated, the number of coincident or similar information among the foregoing attribute information is calculated. If information of a narrow-down attribute is stored in step S925 in FIGS. 9A and 9B, information of a similarity number in the attribute narrowed-down by the user is obtained.

Subsequently, in step S2008, whether or not the information of the similarity number is already stored in the system memory 52 is discriminated. If the information of the similarity number is not stored as a result of the discrimination, step S2010 follows. If the information of the similarity number is already stored, step S2009 follows. In step S2009, whether or not the similarity number obtained in step S2007 is larger than the similarity number stored in the system memory 52 is discriminated. If the similarity number obtained in step S2007 is not larger than the similarity number stored in the system memory 52 as a result of the discrimination, step S2011 follows.

If the similarity number obtained in step S2007 is larger than the similarity number stored in the system memory 52 as a result of the discrimination of step S2009, in step S2010, the current read-out image file is stored into the memory 32 as representative image data. In step S2011, the information of the similarity number obtained in step S2007 is stored into the system memory 52.

Subsequently, in step S2012, the next image file is read out of the recording medium 200 and attribute information of the read-out image file is obtained. In step S2013, the system control unit 50 discriminates whether or not the image file read out in step S2012 is associated with the image file which is read out previously. A discriminating method in this instance is similar to that in the case of step S1906 in FIG. 19. If the image file is associated as a result of the discrimination, the processing routine is returned to step S2007 and information of a similarity number of the attribute information between the image file read out in step S2012 and the representative image data stored inherently is obtained. If the image file is not associated as a result of the discrimination of step S2013, since the representative image data stored at present is selected, the processing is terminated.

As described above, according to the embodiment, since the representative image data in which the similarity number in the attribute information is largest is selected, even if the image is deleted, the representative image can be properly selected.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

This application claims the benefit of Japanese Patent Application No. 2011-106559, filed on May 11, 2011, which is hereby incorporated by reference herein in its entirety.

What is claimed is:

1. An image processing apparatus comprising:
a processor coupled to a memory and programmed to function as:
an analyzation unit configured to analyze attribute information of each of a plurality of images stored in the memory;
a deletion unit configured to delete, in the memory, a representative image representing a group which is constructed with the plurality of images, from the group; and
a selection unit configured to select, in the memory, a representative image representing the group in place of the representative image of the group deleted by the deletion unit on the basis of relation between the attribute information of the deleted representative image and the attribute information of each image included in the group other than an image corresponding to the deleted representative image from images included in the group other than the image corresponding to the deleted representative image, in response to the deletion of the representative image by the selection unit.

2. An apparatus according to claim 1, wherein the selection unit selects an image closest to an attribute of the representative image deleted by the deletion unit.

3. An apparatus according to claim 1, wherein when it is analyzed by the analyzation unit that the deleted representative image has a plurality of attributes, the selection unit selects an image having the largest number of attributes which are same as or similar to the attributes of the representative image deleted by the deletion unit.

4. An apparatus according to claim 1, wherein the selection unit selects an image which coincides with all attributes of the representative image deleted by the deletion unit.

5. An apparatus according to claim 3, wherein when a narrow-down setting is already down, the selection unit selects an image having the largest number of attributes which are same as or similar to the attributes narrowed down from the attributes of the representative image deleted by the deletion unit.

6. An apparatus according to claim 1, wherein the deletion unit and the selection unit operate in a mode for sequentially reproducing the representative image of each group.

7. An apparatus according to claim 1, wherein if the image having the attribute of the representative image deleted by the deletion unit does not exist as a result of the analyzation by the analyzation unit, the selection unit selects an image recorded subsequently to the deleted representative image.

8. An apparatus according to claim 1, wherein the plurality of images included in the group are images sequentially photographed by a continuous photographing, a bracket photographing, a panorama photographing, or a 3D image photographing.

9. An image processing method comprising the steps of:
analyzing attribute information of each of a plurality of images;
deleting a representative image representing a group which is constructed with the plurality of images, from the group; and
selecting a representative image representing the group in place of the representative image of the group deleted in the deletion step on the basis of relation between the attribute information of the deleted representative image and the attribute information of each image included in the group other than an image corresponding to the deleted representative image from images included in the group other than the image corresponding to the deleted representative image, in response to the deletion of the representative image.

10. A non-transitory computer-readable storage medium storing a program comprising a program code for causing a computer to execute the image processing method according to claim 9.

* * * * *